(12) United States Patent
Osmanis et al.

(10) Patent No.: US 10,726,751 B2
(45) Date of Patent: Jul. 28, 2020

(54) TABLE-TOP VOLUMETRIC DISPLAY APPARATUS AND METHOD OF DISPLAYING THREE-DIMENSIONAL IMAGE

(71) Applicant: Lightspace Technologies, SIA, Marupe, Marupes novads (LV)

(72) Inventors: Ilmārs Osmanis, Mārupes novads (LV); Krišs Osmanis, Babītes novads (LV); Mārtiņš Narels, Riga (LV); Uģis Gertners, Riga (LV); Roberts Zabels, Riga (LV); Armands Šmaukstelis, Rēzeknes novads (LV); Ainārs Ozols, Viršu iela (LV)

(73) Assignee: Lightspace Technologies, SIA, Marupe, Marupes Novads (LV)

( * ) Notice: Subject to any disclaimer, the term of this patent is extended or adjusted under 35 U.S.C. 154(b) by 62 days.

(21) Appl. No.: 16/108,372

(22) Filed: Aug. 22, 2018

(65) Prior Publication Data
US 2020/0066194 A1  Feb. 27, 2020

(51) Int. Cl.
*G09G 3/00* (2006.01)
*H04N 13/393* (2018.01)
*G06F 3/041* (2006.01)

(52) U.S. Cl.
CPC ............ *G09G 3/003* (2013.01); *G06F 3/041* (2013.01); *H04N 13/393* (2018.05)

(58) Field of Classification Search
None
See application file for complete search history.

(56) References Cited

U.S. PATENT DOCUMENTS

| 5,764,317 | A | * | 6/1998 | Sadovnik | ........... | G02B 27/2278 |
| | | | | | | 349/5 |
| 6,064,423 | A | * | 5/2000 | Geng | ................. | G02B 27/2292 |
| | | | | | | 348/36 |

(Continued)

FOREIGN PATENT DOCUMENTS

WO    2018/100000 A2    6/2018

OTHER PUBLICATIONS

Sullivan, Alan, "58.3: A Solid-state Multi-planar Volumetric Display", SID Symposium Digest of Technical Papers, vol. 34, Issue 01, May 2003, pp. 1531-1533.

(Continued)

*Primary Examiner* — Nicholas J Lee
(74) *Attorney, Agent, or Firm* — Ziegler IP Law Group LLC

(57) ABSTRACT

A table-top volumetric display apparatus for presenting three-dimensional imagery. The volumetric display apparatus includes multi-layer volumetric display including plurality of display elements being arranged substantially parallelly to form projection volume, each of the plurality of display elements being implemented by way of at least one optical diffuser; volumetric display driver coupled to the aforesaid display, volumetric display driver being configured to control operational states of the plurality of display elements; processing unit configured to process three-dimensional image to generate plurality of image slices, wherein given image slice is to be projected onto corresponding display element; projector configured to project the plurality of image slices onto the plurality of display elements; and control unit coupled to the volumetric display driver, processing unit and the projector, wherein the control unit is configured to control the volumetric display driver and the projector to present the three-dimensional image within the projection volume.

21 Claims, 9 Drawing Sheets

(56) References Cited

U.S. PATENT DOCUMENTS

| | | | |
|---|---|---|---|
| 2002/0113752 A1* | 8/2002 | Sullivan | G02B 27/2278 345/6 |
| 2002/0113753 A1* | 8/2002 | Sullivan | G02B 30/52 345/6 |
| 2002/0113758 A1 | 8/2002 | Sullivan | |
| 2015/0029315 A1* | 1/2015 | Refai | G02B 27/2292 348/51 |
| 2017/0082855 A1 | 3/2017 | Christmas et al. | |
| 2019/0154809 A1* | 5/2019 | Akkaya | G01S 7/4817 |

OTHER PUBLICATIONS

International Search Report and Written Opinion received for International Patent Application No. PCT/EP2019/071892, dated Nov. 20, 2019, 13 pages.

* cited by examiner

TABLE-TOP VOLUMETRIC DISPLAY APPARATUS AND METHOD OF DISPLAYING THREE-DIMENSIONAL IMAGE

TECHNICAL FIELD

The present disclosure relates generally to display apparatuses; and more specifically, to table-top volumetric display apparatuses for presenting three-dimensional images, such table-top volumetric display apparatuses comprises multi-layer volumetric displays, volumetric display drivers, processing units, projectors and control units. Furthermore, the present disclosure also relates to methods for presenting three-dimensional images, via the aforementioned table-top volumetric display apparatuses.

BACKGROUND

Owing to enhanced comprehensibility and effortless interpretation of a three-dimensional image, popularity of visually representing information by way of three-dimensional images has increased exponentially. With advancements in technology, display technologies now allow for realistically representing two-dimensional images, as well as three-dimensional images. Therefore, nowadays, three-dimensional imagery is used in the fields of education (for example, to show three-dimensional models to students at schools and colleges), civil engineering, air traffic control management (for example, to model airspace surrounding an airport), architecture, military (for example, to depict topographical models of battlefields), and the like.

Nowadays, several techniques are employed to present three-dimensional imagery. In a first example, three-dimensional information associated with a given environment of interest (for example, such as, a neighborhood) may be represented by way of arranging sand on a table to create a scaled three-dimensional model of the given environment (terrain). Optionally the surface of the sand structures can be utilized as projection screen and complemented by additional information via top-down image projection. However, such three-dimensional sand models require large set-up time to display a single three-dimensional view and are not easily portable. Moreover, the true three-dimensionality is captured only within static relief-based formations, while typically dynamically changing information is represented as a 2D projection. Therefore, to overcome limitations associated with the sand tables two-dimensional displays may be employed. In a second example, two-dimensional displays such as liquid crystal displays (LCD) are employed to present three-dimensional images of a given three-dimensional object/scene thereupon. Typically, when three-dimensional images are presented on conventional two-dimensional displays (such as liquid crystal displays, light-emitting diode based displays, and the like) the user perceives the depth of the 3D scene via psychological depth cues—such as perspective, shadowing, occlusion etc. However, such displays fail to present physical depth cues which are essential for a realistic representation of three-dimensional images and subsequently such images lack comprehensibility and coherence. In a third example, devices such as three-dimensional printers may be employed to overcome the limitations associated with the two-dimensional displays. However, this approach is rather similar to sand-tables. 3D-printing operations are very time consuming and fail to provide a realistic real-time three-dimensional representation of a dynamic content. In a fourth example, modern three-dimensional display technologies such as stereoscopic displays may be employed for a realistic three-dimensional representation of the given three-dimensional object/scene. However, there also exist limitations associated with such technologies related to three-dimensional imaging for example, such as, vergence-accommodation conflict leading to eye fatigue (thereby, preventing prolonged use of such technologies). In a fifth example, head-mounted stereo displays may be employed to provide higher degree of freedom for movement. Nevertheless, the added bulkiness of a head-mounted display may strain muscles, also wearable obstructing constructions limit interpersonal communication. Moreover, besides added benefits of higher immersion in the 3D content, head mounted stereoscopic displays also cause accommodation-convergence conflict. Thus, longer wearing and viewing periods of head-mounted display technologies cause discomfort and hinder the concentration of the user. In a sixth example, the three-dimensional graphical content may be presented on multi-view displays. Such multi-view displays approximate the 3D scene by providing a limited number of views (from different angles/perspectives) to users. However, approach of displaying multiple views of a 3D scene requires a rather complicated image processing thus limiting practically displayable number of views. Thus, typically the three-dimensional image suffers from lower resolution and/or practically usable viewing angle. Consequently, the multi-view displays do not provide comprehensible representation of the three-dimensional image. In a seventh example, the multi-view displays may be replaced by technologies such as light-field technologies to overcome limitations associated therewith. Such light-field technologies employ multiple image projectors to provide a significantly good resolution three-dimensional representation of the images. Furthermore, such technologies require longer processing time owing to intensive computation. Subsequently, real-time representation of the three-dimensional image may be limited and/or require large computational resources.

Presently, to overcome the limitations associated with the aforesaid techniques, volumetric-type displays are increasingly being employed to present the three-dimensional imagery. Such a volumetric-type displays employ projection equipment for projecting light in a three-dimensional volume to create a realistic three-dimensional image of a given three-dimensional object/scene. However, there are a number of limitations associated with employing conventional volumetric-type displays for presenting the realistic three-dimensional image of the given three-dimensional object/scene, such as difficulty in scalability, computationally intensive data processing, and the like.

Therefore, in the light of the foregoing discussion, there exists a need to overcome the aforementioned drawbacks associated with conventional techniques employed for presenting three-dimensional imagery.

SUMMARY

The present disclosure seeks to provide a table-top volumetric display apparatus for presenting a three-dimensional image. The present disclosure also seeks to provide a method for presenting a three-dimensional image, via a table-top volumetric display apparatus. The present disclosure seeks to provide a solution to the existing problems such as improper scalability and representation of three-dimensional images within conventional display apparatuses for three-dimensional imaging. An aim of the present disclosure is to provide a solution that overcomes at least partially the problems encountered in prior art, and offers a robust, user-friendly table-top volumetric display apparatus capable of truthful representation of three-dimensional graphical information.

In one aspect, an embodiment of the present disclosure provides a table-top volumetric display apparatus for presenting a three-dimensional image, the table-top volumetric display apparatus comprising:

- a multi-layer volumetric display comprising a plurality of display elements, the plurality of display elements being arranged substantially parallelly to form a projection volume, each of the plurality of display elements being implemented by way of at least one optical diffuser;
- a volumetric display driver coupled to the multi-layer volumetric display, the volumetric display driver being configured to control operational states of the plurality of display elements;
- a processing unit configured to process the three-dimensional image to generate a plurality of image slices, wherein a given image slice is to be projected onto a corresponding display element;
- at least one projector configured to project the plurality of image slices onto the plurality of display elements; and
- a control unit coupled to the volumetric display driver, the processing unit and the at least one projector, wherein the control unit is configured to control the volumetric display driver and the at least one projector to present the three-dimensional image within the projection volume.

In another aspect, an embodiment of the present disclosure provides a method for presenting a three-dimensional image, via a table-top volumetric display apparatus comprising a multi-layer volumetric display and at least one projector, wherein the multi-layer volumetric display comprises a plurality of display elements, the plurality of display elements being arranged substantially parallelly to form a projection volume, the method comprising:

- processing the three-dimensional image to generate a plurality of image slices, wherein a given image slice is to be projected onto a corresponding display element; and
- projecting, via the at least one projector, the plurality of image slices onto the plurality of display elements, whilst controlling operational states of the plurality of display elements, to present the three-dimensional image within the projection volume.

Embodiments of the present disclosure substantially eliminate or at least partially address the aforementioned problems in the prior art, and enable truthful depiction of the three-dimensional image within the table-top volumetric display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
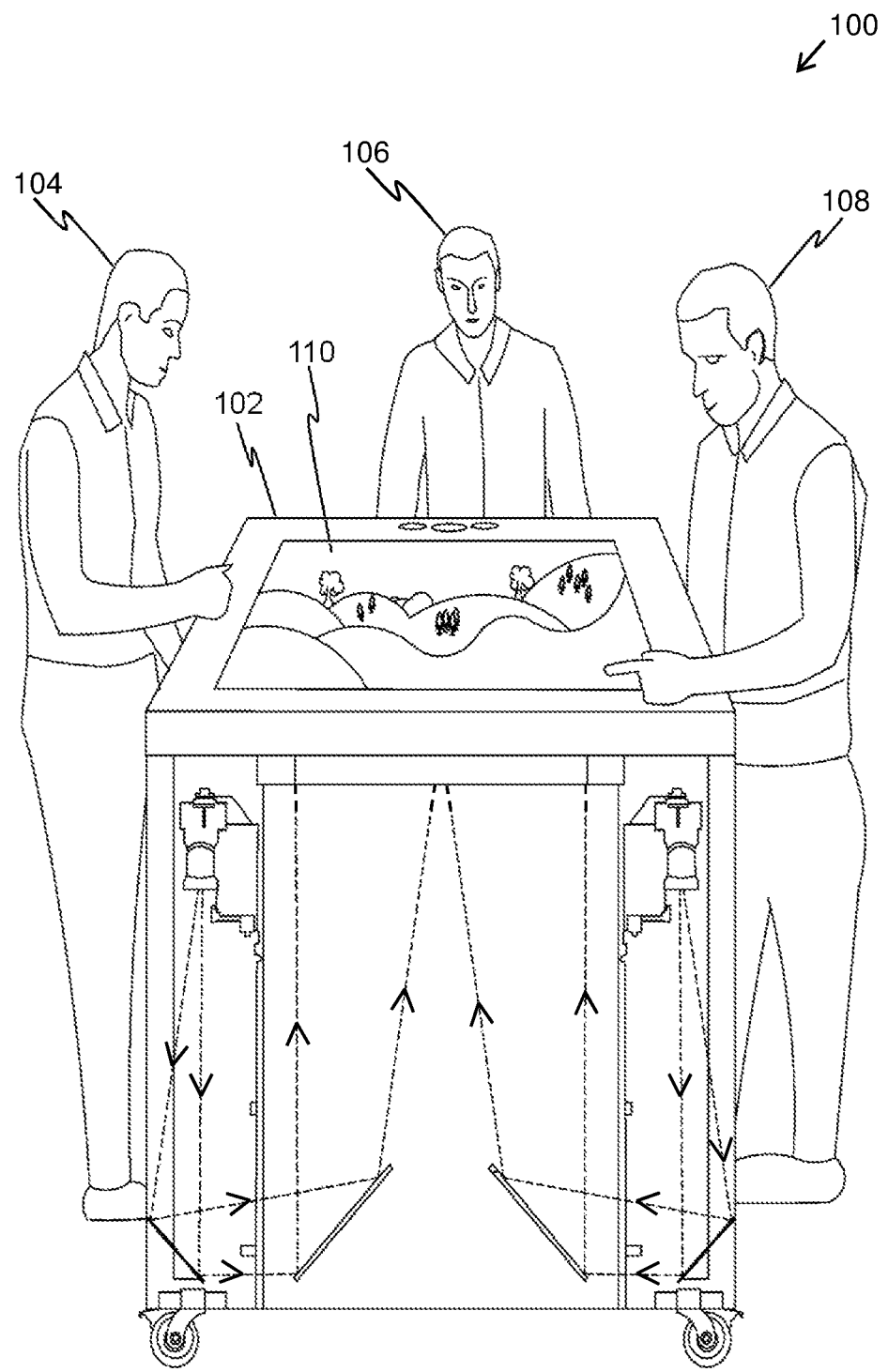
FIG. 1 is a schematic illustration of an environment for using a table-top volumetric display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a table-top volumetric display apparatus for presenting a three-dimensional image, the table-top volumetric display apparatus comprising:

- a multi-layer volumetric display comprising a plurality of display elements, the plurality of display elements being arranged substantially parallelly to form a projection volume, each of the plurality of display elements being implemented by way of at least one optical diffuser;

a volumetric display driver coupled to the multi-layer volumetric display, the volumetric display driver being configured to control operational states of the plurality of display elements;

a processing unit configured to process the three-dimensional image to generate a plurality of image slices, wherein a given image slice is to be projected onto a corresponding display element;

at least one projector configured to project the plurality of image slices onto the plurality of display elements; and a control unit coupled to the volumetric display driver, the processing unit and the at least one projector, wherein the control unit is configured to control the volumetric display driver and the at least one projector to present the three-dimensional image within the projection volume.

In another aspect, an embodiment of the present disclosure provides a method for presenting a three-dimensional image, via a table-top volumetric display apparatus comprising a multi-layer volumetric display and at least one projector, wherein the multi-layer volumetric display comprises a plurality of display elements, the plurality of display elements being arranged substantially parallelly to form a projection volume, the method comprising:

processing the three-dimensional image to generate a plurality of image slices, wherein a given image slice is to be projected onto a corresponding display element; and projecting, via the at least one projector, the plurality of image slices onto the plurality of display elements, whilst controlling operational states of the plurality of display elements, to present the three-dimensional image within the projection volume.

The present disclosure provides the aforementioned table-top volumetric display apparatus and the aforementioned method for presenting the three-dimensional image. The table-top volumetric display apparatus described herein can be utilized by a single user, or by multiple users to view the three-dimensional image from various perspectives. The table-top volumetric display apparatus truthfully depicts the three-dimensional image, thereby, eliminating a requirement for additional viewing aids (such as glasses or specialized headgear) to view the three-dimensional image. The table-top volumetric display apparatus accurately represents real physical and psychological depth cues to the user, thereby reducing the user's cognitive load and making the three-dimensional image simpler to understand, even for untrained users. The table-top volumetric display apparatus can also receive and process multiple data feeds to display a composite three-dimensional image containing mutually complementary graphical information. A size of the table-top volumetric display apparatus can be suitably chosen, based upon a size of the three-dimensional image that is to be displayed. Beneficially, when the table-top volumetric display apparatus is required to have a large size, both large-sized optical diffusers as well as small-sized optical diffusers can be employed without compromising on image quality. Specifically, utilizing the small-sized optical diffusers can yield multi-layer volumetric displays with large viewing fields with simpler design and in an affordable manner.

Throughout the present disclosure, the term "volumetric display apparatus" used herein relates to specialized equipment for presenting the three-dimensional image to a user in a manner that the three-dimensional image truthfully appears to have actual physical depth. In other words, the volumetric display apparatus is operable to act as a device for visually presenting the three-dimensional image in a three-dimensional space. It will be appreciated that the present disclosure describes a volumetric display apparatus that is implemented as a top surface of a table (namely, a workbench, a stand, and the like), and is therefore referred to as the "table-top volumetric display apparatus".

In some implementations, the table-top volumetric display apparatus could be a large-sized apparatus that can be employed to present large-sized three-dimensional images (for example, such as terrain models, anatomical models, mechanical models, and so forth). In other implementations, the table-top volumetric display apparatus could be a small-sized apparatus that can be employed to present small-sized three-dimensional images (for example, such as models of household objects, laboratory instrument models, educational models, and so forth).

Furthermore, the term "three-dimensional image" relates to a volumetric image (namely, an image having a height, a width, and a depth in the three-dimensional space). A given three-dimensional image could be a given volumetric image of at least one three-dimensional object (for example, such as a statue, a vehicle, a weapon, a musical instrument, an abstract design, and the like), a three-dimensional scene (for example, such as a beach scene, a mountainous environment, an indoor environment, and the like), and so forth. Moreover, the term "three-dimensional image" also encompasses a three-dimensional computer-generated surfaces. Furthermore, the term "three-dimensional image" also encompasses a three-dimensional point cloud.

The table-top volumetric display apparatus comprises the multi-layer volumetric display. Notably, the multi-layer volumetric display comprises the plurality of display elements, the plurality of display elements being arranged substantially parallelly to form the projection volume.

Throughout the present disclosure the term "multi-layer volumetric display" relates to specialized layered equipment that, in operation, displays the three-dimensional image. Furthermore, the term "display element" relates to a component of the multi-layer volumetric display that allows for displaying at least a portion of the three-dimensional image. Specifically, each layer of the multi-layer volumetric display is implemented by way of a single display element. Moreover, the term "projection volume" relates to a three-dimensional space within which the three-dimensional image is to be displayed, such a three-dimensional space being formed within a physical arrangement of the plurality of display elements.

Optionally, a number of the plurality of display elements within the multi-layer volumetric display lies within a range of 2 to 50. As an example, the multi-layer volumetric display may comprise 2, 3, 4, 5, 6, 7, 8, 9, 10, 11, 12, 13, 14, 15, 16, 17, 18, 19, 20, 21, 22, 23, 24, 25, 30, 35, 40, 45 or 50 display elements. Alternatively, optionally, the number of the plurality of display elements within the multi-layer volumetric display is greater than 50. As an example, the multi-layer volumetric display may comprise 55, 60, 65, 70, 75, 80, 85, 90, 95 or 100 display elements.

Optionally, the plurality of display elements are arranged to have equal inter-element spacing. The term "inter-element spacing" relates to a gap (namely, a space) between a pair of adjacent display elements. In an example, the plurality of display elements may be arranged as a 100 millimeters thick stack. In such a case, 11 display elements may be arranged to have 10 millimeters inter-element spacing between each pair of adjacent display elements.

Alternatively, optionally, the plurality of display elements are arranged to have unequal inter-element spacing. Optionally, in this regard, the inter-element spacing linearly increases with increase in a distance between the user and a given pair of adjacent display elements. In other words, a pair of adjacent display elements that is nearest to the user may have minimum inter-element spacing whereas a pair of adjacent display elements that is farthest from the user may have maximum inter-element spacing.

Optionally, the inter-element spacing ranges from 0.5 millimeters to 50 millimeters. As an example, the given inter-element spacing may be 0.5, 0.6, 0.7, 0.8, 0.9, 1, 2, 3, 4, 5, 10, 15, 20, 25, 30, 35, 40, 45 or 50 millimeters.

It will be appreciated that the number of display elements and inter-element spacing within the plurality of display elements define an overall addressable projection volume within the table-top volumetric display apparatus. Therefore, a depth of the projection volume can be adjusted by changing at least one of the aforesaid two parameters. Notably, the depth of the projection volume can be changed by changing a number of display elements and/or changing the inter-element spacing between the plurality of display elements.

Furthermore, it will also be appreciated that depth resolution (namely, a possible density of information in the depth-direction or z-direction) of the multi-layer volumetric display is based upon the number of display elements and the inter-element spacing between the plurality of display elements. As an example, to increase the depth resolution of the multi-layer volumetric display, the number of display elements can be increased and the inter-element spacing within the plurality of display elements can be decreased.

Optionally, the plurality of display elements are substantially flat in shape. Alternatively, optionally, the plurality of display elements are substantially curved in shape.

Optionally, a volumetric refresh rate of the multi-layer volumetric display lies within 20 Hz to 120 Hz. Throughout the present disclosure, the term "volumetric refresh rate" relates to a rate at which a given plurality of image slices pertaining to a single three-dimensional image are displayed repeatedly on the plurality of display elements of the multi-layer volumetric display. In other words, when the given plurality of image slices pertaining to the single three-dimensional image are displayed once at the multi-layer volumetric display, the multi-layer volumetric display is said to have displayed one volume of the single three-dimensional image. Therefore, the volumetric refresh rate of the multi-layer volumetric display relates to a number of volumes that the multi-layer volumetric display can display in one second. It will be appreciated that a high volumetric refresh rate facilitates a flicker-less image viewing experience for the user. As an example, if a given volumetric refresh rate of the multi-layer volumetric display is 30 Hz, the multi-layer volumetric display can display 30 volumes of a given three-dimensional image in one second.

Optionally, the volumetric refresh rate of the multi-layer volumetric display ranges from 40 Hz to 60 Hz. More optionally, the volumetric refresh rate of the multi-layer volumetric display is 50 Hz.

As mentioned previously, each of the plurality of display elements are implemented by way of at least one optical diffuser. Throughout the present disclosure, the term "optical diffuser" relates to an optical component that, in operation, displays a given image slice thereupon. Notably, at least one optical diffuser of a given display element, in operation, receives a projection of a given image slice to display graphical information represented in the given image slice at the given display element. Therefore, optical diffusers of the plurality of display elements, in operation, receive projections of the plurality of image slices to display graphical information represented in the plurality of image slices at the plurality of display elements.

Optionally, a given optical diffuser is implemented by way of a cholesteric-type liquid crystal diffuser element. Optionally, the given optical diffuser is electrically switchable to toggle between at least two operational states, the at least two operational states comprising at least an optically transparent state and an optically diffusive state. When the given optical diffuser is in the optically transparent state, light within the visible spectrum of electromagnetic radiation without scattering substantially passes therethrough. When the given optical diffuser is in the optically diffusive state, a majority of light incident thereupon is forward scattered. In simpler terms, the optically transparent state can be understood to be a "substantially-transmissive state" and the optically diffusive state can be understood to be a "substantially-diffuse state". Notably, the given optical diffuser displays a given image slice projected thereupon, only while the given optical diffuser is in the optically diffusive state. The given optical diffuser can be understood to act as an electrically controllable screen, which passes light through itself whilst operating in the optically transparent state and makes such light visible to the user whilst operating in the optically diffusive state. Therefore, in operation, optical diffuser(s) of each display element is/are rapidly and sequentially switched between the at least two operational states to display the plurality of image slices. As a result, there is produced a visible effect of actual physical depth within the three-dimensional image. It is to be understood that at a given point of time, only optical diffuser(s) of one display element would be in the optically diffusive state while remaining optical diffusers of remaining display elements would be in the optically transparent state.

Optionally, the plurality of display elements are implemented by way of active electrically controllable optical diffuser elements, for example, of liquid crystal type.

Optionally, a thickness of the at least one optical diffuser lies within a range of 0.1 millimeters to 1 millimeter. In an example, the thickness of the at least one optical diffuser may be 0.1, 0.2, 0.3, 0.4, 0.5, 0.6, 0.7, 0.8, 0.9 or 1 millimeter. It will be appreciated that since the at least one optical diffuser is rather thin, the multi-layer volumetric display may optionally include a plurality of supporting slabs corresponding to the plurality of display elements, wherein a given supporting slab is employed to support at least one optical diffuser of a given display element. The at least one optical diffuser of the given display element is attached to the supporting slab corresponding to the given display element by way of a refractive index-matched adhesive (for example, such as optical glue, resin, and the like). The plurality of supporting slabs provide positional accuracy as well as rigidity to the plurality of display elements. Furthermore, the plurality of supporting slabs also allow for providing inter-element spacing between the plurality of display elements. In other words, the plurality of supporting slabs also act as inter-display element spacers. As an example, the inter-element spacing between the plurality of display elements may substantially correspond to thickness of the plurality of supporting substrates. Optionally, the plurality of supporting slabs are made of a transparent material that is refractive index-matched to the at least one optical diffuser.

Optionally, a given optical diffuser comprises:
- two supporting substrates arranged substantially parallelly to each other, wherein inwardly facing surfaces of the two supporting substrates are coated with a transparent electrode material;
- a plurality of spacers arranged between the two supporting substrates to provide a substantially uniform separation of the two supporting substrates;
- an electro-optically active medium between the two supporting substrates;
- at least one polymeric seal along a periphery of the two supporting substrates, the at least one polymeric seal being employed to contain the electro-optically active medium within the given optical diffuser, and
- electrically conductive busbars that, in operation, provide electrical power to the two supporting substrates.

Optionally, the two supporting substrates act as an electrical insulator to contain high voltage electrical signals for operation of the given optical diffuser, within the given optical diffuser.

Optionally, in the given optical diffuser, the transparent electrode material coating of the two supporting substrates acts as electrodes (or plates) that receive electrical power for operation of the given optical diffuser. Furthermore, the two supporting substrates provide rigidity to the given optical diffuser and define a volume that contains the electro-optically active medium. Optionally, the two supporting substrates are substantially transparent to light of visible wavelength. The two supporting substrates can be implemented by way of two mineral glass plates, two transparent organic compound plates, two flexible transparent sheets, and the like. The transparent electrode material that is used to coat the inwardly facing surfaces of the two supporting substrates could be indium tin oxide, graphene, zinc-oxide based transparent material, conductive polymer material, metallic nanowire mesh, and the like.

Optionally, outwardly facing surfaces of the two supporting substrates are coated with an anti-reflective coating. The anti-reflective coating that is used to coat the outwardly facing surfaces of the two supporting substrates allows for minimizing glare and improving overall contrast of the three-dimensional image. The anti-reflective coating can, for example, have multiple layers of $SiO_2$—$TiO_2$, $SiO_2$—$Nb_2O_5$, and the like. Notably, the anti-reflective coating is utilized when gaps between the plurality of display elements are not refractive index-matched to the two supporting substrates (for example, when the gaps between the plurality of display elements contain air). When such gaps include a medium that is refractive index-matched to the two supporting substrates, use of the anti-reflective material is not necessary.

Optionally, in the given optical diffuser, the plurality of spacers define a gap between the two supporting substrates. Optionally, the plurality of spacers are evenly distributed within the gap between the two supporting substrates. The plurality of spacers can be microspheres of a desired refractory material (for example, such as glass, polycarbonate, Poly(methyl methacrylate)), wherein the refractive index of the spacers is matched with the material of the electro-optically active medium.

Optionally, in the given optical diffuser, the electro-optically active medium is a liquid crystal medium that exhibits cholesteric texture. Furthermore, in the given optical diffuser, the polymeric seal allows for securely sealing the two supporting substrates, thereby, containing the electro-optically active medium within the given optical diffuser.

Optionally, in the given optical diffuser, the electrically conductive busbars are made of a conductive material. Such a conductive material may be transparent or non-transparent. In an example, the electrically conductive busbars are made of copper-based materials. The electrically conductive busbars are adhered or soldered to the transparent electrode material in a manner that provides good electrical contact therebetween. The electrically conductive busbars are strategically arranged within the given optical diffuser in a manner that allows minimal viewing obstruction. In this regard, the electrically conductive busbars are arranged in an L-shape configuration along edges of the given optical diffuser. The electrically conductive busbars may be arranged along at least one edge of the given optical diffuser. It will be appreciated that edges of the given optical diffuser that do not include the electrically conductive busbars allow for placing the polymeric seal much closer to outermost periphery of the given optical diffuser. As a result, "dead" or inactive regions of the given optical diffuser are minimized since the electro-optically active medium occupies space in direct vicinity of such edges that do not include the electrically conductive busbars.

Optionally, the at least one optical diffuser comprises a plurality of optical diffusers, the plurality of optical diffusers being arranged in a tiled manner. Optionally, to arrange the plurality of optical diffusers in the tiled manner, individual optical diffusers are placed upon a corresponding supporting slab, and are adhered to the corresponding supporting slab by way of an adhesive that is refractive index-matched to the corresponding supporting slab. In other words, a given supporting slab allows for arranging all optical diffusers forming a single display element, in the tiled manner. Furthermore, optionally, a given supporting slab is refractive index-matched to supporting substrates of its corresponding optical diffuser. Therefore, the adhesive is refractive index-matched to both the given supporting slab and the supporting substrates of the corresponding optical diffuser. As a result, there is a smooth transition of refractive index from one media to another. Optionally, a number of such supporting slabs is equal to the number of the plurality of display elements. Therefore, for each display element of the multi-layer volumetric display, its corresponding supporting slab includes a tiled arrangement of the plurality of optical diffusers.

Optionally, upon arranging the plurality of optical diffusers in the tiled manner, non-addressable seams are formed at boundaries of adjacent optical diffusers. Notably, since polymeric seals of optical diffusers are arranged at such boundaries, electro-optically active medium of the optical diffusers is not present along such boundaries. As a result, the non-addressable seams are formed at the boundaries of adjacent optical diffusers. It will be appreciated that a thickness of a given non-addressable seam between two optical diffusers is substantially equal to a total thickness of two polymeric seals of both the optical diffusers. Nevertheless, such non-addressable seams do not appear to disturb the user's viewing experience when the user uses the multi-layer volumetric display from a distance equal to or greater than 0.6 meters.

It will be appreciated that the tiled arrangement of the plurality of optical diffusers can be employed to form large-sized display elements. Such large-sized display elements are used when the table-top volumetric display apparatus is to be employed to present the large-sized three-dimensional images. Furthermore, transversal dimensions of the multi-layer volumetric display can be increased by employing wide optical diffusers.

Optionally, in the tiled arrangement of the plurality of optical diffusers, electrically conductive busbars of the plurality of optical diffusers are placed along a periphery of the tiled arrangement of the plurality of optical diffusers. Notably, since the electrically conductive busbars typically are non-transparent to visible light, they are placed along the periphery of the tiled arrangement to allow for minimally obstructing the user's view when the tiled arrangement is used within the multi-layer volumetric display.

As an example, the multi-layer volumetric display may comprise 16 display elements arranged substantially parallelly to each other. Each of the 16 display elements may be implemented by way of 4 optical diffusers. In such an example, the 4 optical diffusers could be arranged in a tiled manner, as a 2*2 rectangle. Notably, in such a tiled arrangement, electrically conductive busbars of the 4 optical diffusers may be arranged along a periphery of the rectangle. In such an example, a size of each optical diffuser may be 300*400 millimeters, thereby making transversal dimensions of each display element to be 600*800 millimeters. Such transversal dimensions of each display element correspond to a diagonal of approximately 120 centimeters (or about 47 inches).

Optionally, the plurality of display elements are laminated together. Upon such lamination, the plurality of display elements are arranged together (in a substantially parallel manner) as a single block to form the multi-layer volumetric display. It will be appreciated that laminating the plurality of display elements allows for improving an overall rigidity of the plurality of display elements. Notably, upon lamination, the plurality of display elements are less prone to mechanical shock. Optionally, at least one adhesive is employed to laminate the plurality of display elements. In such a case, the at least one adhesive is refractive-index matched with supporting substrates of the at least one optical diffuser. As a result, internal reflections are minimized even without depositing the anti-reflective coatings on outwardly facing surfaces of the at least one optical diffuser. It will be appreciated that when multiple adhesives are employed for the aforesaid lamination, the multiple adhesives are refractive index-matched with each other.

Alternatively, optionally, the plurality of display elements are arranged in a stacked manner. Notably, in such a stacked arrangement, the plurality of display elements are arranged substantially parallelly to form the multi-layer volumetric display. The stacked arrangement of the plurality of display elements could have gaps therebetween. Optionally, in the stacked arrangement, gaps contain air or a liquid medium that is refractive index-matched with the supporting substrates of the at least one optical diffuser. Such a liquid medium can be circulated between the stacked arrangement to allow for cooling of the at least one optical diffuser of the plurality of display elements.

Optionally, the multi-layer volumetric display further comprises at least one protective cover employed to protect the plurality of display elements. The at least one protective cover is arranged to cover (namely, surround) at least one outwardly facing surface of the multi-layer volumetric display, thereby protecting the plurality of display elements which can generally be fragile. Beneficially, the at least one protective cover protects the plurality of display elements from unwanted impacts, dirt and touch damage (for example, such as fingerprint marks, scratch marks). Optionally, the at least one protective cover is arranged to encapsulate the multi-layer volumetric display. The at least one protective cover is in a form of a film, a sheet, a casing, glass, and the like.

Furthermore, optionally, an outwardly facing surface of the at least one protective cover is coated with anti-reflective and/or oleophobic coating.

The table-top volumetric display apparatus comprises the volumetric display driver coupled to the multi-layer volumetric display, the volumetric display driver being configured to control the operational states of the plurality of display elements. The term "volumetric display driver" relates to specialized hardware, software, firmware, or a combination of these, that is configured to control the operational states of the plurality of display elements of the multi-layer volumetric display. Notably, the volumetric display driver electrically controls the operational states of the plurality of display elements, based upon the plurality of image slices that are projected via the at least one projector.

Optionally, a given display element has at least two operational states, the at least two operational states comprising at least an optically transparent state and an optically diffusive state. It will be appreciated that the "operational state" of the given display element corresponds to the operational state (namely, an operational characteristic) of the at least one optical diffuser that is used to implement the given display element. Therefore, when the given display element is in the optically transparent state, light within the visible spectrum of electromagnetic radiation substantially passes through at least one optical diffuser of the given display element and the image slice is not displayed at the given display element. However, when the given display element is in the optically diffusive state, a majority of light incident upon the at least one optical diffuser is forward scattered and the image slice is displayed at the given display element. In other words, the given display element would be in the optically transparent state when the at least one diffuser of the given display element is in the optically transparent state, whereas the display element would be in the optically diffusive state when the at least one diffuser of the given display element is in the optically diffusive state. Notably, all optical diffuser(s) of a given display element would have same operational state at a given point of time.

The volumetric display driver electrically controls the operational states of the plurality of display elements in a manner that, at any given time, only a single display element whereupon a given image slice is to be projected, is in the optically diffusive state while remaining display elements are in the optically transparent state. Specifically, to switch a given display element to a given operational state, the volumetric display driver switches at least one optical diffuser of the given display element to the given operational state. Furthermore, the volumetric display driver utilizes a control signal for managing operation of the at least one optical diffuser. Optionally, the volumetric display driver controls each of the plurality of display elements to be in the optically diffusive state, in a cyclic manner. In an embodiment, a progressive order of switching the plurality of display elements to the optically diffuse state, is from a nearest display element to a farthest display element with respect to the user. In another embodiment, the progressive order of switching the plurality of display elements to the optically diffuse state is from the farthest display element to the nearest display element with respect to the user. In yet another embodiment, an interlaced order is employed for switching the plurality of display elements to the optically diffuse state. It will be appreciated that the volumetric display driver controls the operational states of the plurality of display elements substantially synchronously with the projection of the plurality of image slices upon the plurality of display elements.

In an example, the at least one projector may project 3 image slices IS1, IS2 and IS3 of a given three-dimensional image that are to be displayed upon 3 display elements DE1, DE2 and DE3 respectively. In such a case, when the image slice IS1 is to be displayed upon the display element DE1, the volumetric display driver may be configured to switch the display element DE1 to the optically diffusive state while switching the remaining display elements DE2 and DE3 to the optically transparent state. Similarly, when the image slice IS2 is to be displayed upon the display element DE2, the volumetric display driver may be configured to switch the display element DE2 to the optically diffusive state while switching the remaining display elements DE1 and DE3 to the optically transparent state. Furthermore, when the image slice IS3 is to be displayed upon the display element DE3, the volumetric display driver may be configured to switch the display element DE3 to the optically diffusive state while switching the remaining display elements DE1 and DE2 to the optically transparent state. The aforesaid switching pattern may be repeated cyclically for multiple times within a single second.

Optionally, the volumetric display driver controls operation of the multi-layer volumetric display according to a master-slave configuration. In such a case, the volumetric display driver comprises a plurality of driver logic blocks for synchronizing operation of the at least one projector and the plurality of display elements, the plurality of driver logic blocks being arranged hierarchically in a manner that one driver logic block functions as a 'master' whereas other driver logic block(s) functions as 'slave(s)'. The 'master' provides a synchronization signal to the 'slave(s)' for implementing such a synchronization operation which is described later hereinbelow.

The table-top volumetric display apparatus further comprises the processing unit configured to process the three-dimensional image to generate the plurality of image slices, wherein a given image slice is to be projected onto a corresponding display element. Throughout the present disclosure, the term "image slice" relates to a portion (namely, a slice or a fragment) of the three-dimensional image. The three-dimensional image can be deconstructed (or decomposed) into multiple image slices corresponding to multiple depths within the three-dimensional image, by way of image processing algorithms. Notably, the three-dimensional image is a combination of the plurality of image slices. It will be appreciated that when a given display element is implemented by way of a single optical diffuser, an entire image slice is displayed on the single optical diffuser, whereas when the given display element is implemented by way of multiple optical diffusers, different parts of the image slice are displayed on different optical diffusers.

As an example, a three-dimensional image IMG may depict a three-dimensional scene of a park having a fountain, a carousel and a pond. Specifically, regions R1, R2 and R3 of the three-dimensional image IMG may depict the fountain, the carousel and the pond respectively. In such an example, the processing unit may process the aforementioned three-dimensional image IMG to generate the plurality of image slices corresponding thereto. In such an example, the region R1 of the three-dimensional image IMG depicting the fountain may constitute a first image slice, the region R2 of the three-dimensional image IMG depicting the carousel may constitute a second image slice and the region R3 of the three-dimensional image IMG depicting the pond may constitute a third image slice. In such an example, the given three-dimensional image IMG can be understood to be a combination of the first, second and third image slices.

The processing unit is implemented by way of hardware, software, firmware, or a combination of these, that is configured to process at least one given three-dimensional image to obtain its constituent plurality of image slices. The processing unit can be understood to be a computer unit that performs processing tasks for the table-top volumetric display apparatus. Optionally, the processing unit comprises at least one graphics processing unit configured to process the three-dimensional image to generate the plurality of image slices. Throughout the present disclosure, the term "graphics processing unit" relates to specialized hardware, software, firmware, or a combination of these, that is employed for processing the three-dimensional image. It will be appreciated that the at least one graphics processing unit typically comprises thousands of cores (in practice processing cores etc.) that allow for parallel processing of three-dimensional images. Furthermore, the at least one graphics processing unit is configured to parallelly process three-dimensional images at a substantially-high computation rate to generate the plurality of image slices corresponding to each image of the multiple three-dimensional images. The computational tasks are conveyed for execution on the at least one graphics processing unit by utilizing application programming interfaces (APIs), possibly in various combinations, for example, such as NVIDIA®CUDA®, OpenCL®, DirectX®, OpenGL®.

As an example, the processing unit may comprise four graphics processing units. In such an example, multiple graphics processing units may optimally divide graphics processing tasks therebetween for ensuring the three-dimensional image to be displayed at a high volumetric refresh rate. Furthermore, the four graphics processing units can be integrated into a single workstation that can execute a control application for operation of the four graphics processing units.

Optionally, the three-dimensional image is processed to generate a predefined number of image slices corresponding thereto. In an embodiment, the predefined number of plurality of image slices that are to be generated upon processing of the three-dimensional image is equal to the number of the plurality of display elements within the multi-layer volumetric display. In such a case, all display elements are in use, and one image slice is to be projected per display element. In another embodiment, the predefined number of the plurality of image slices generated upon processing of the three-dimensional image is lesser than the number of the plurality of display elements within the multi-layer volumetric display. In such a case, there would exist at least one unused display element, after all image slices are projected upon the plurality of display elements. As an example, the number of plurality of display elements in the multi-layer volumetric display may be equal to 10. In such a case, the three-dimensional image may be processed to generate 2, 3, 4, 5, 6, 7, 8, 9 or 10 image slices.

Furthermore, optionally, the processing unit is configured to perform at least one image processing operation whilst processing the three-dimensional image to generate the plurality of image slices. The at least one image processing operation could relate to pre-processing operations as well as post-processing operations. Examples of the at least one image processing operation include, but are not limited to, linear transformation (for example, such as translation, rotation and the like) of the three-dimensional image, cropping of the three-dimensional image, addition and/or removal of graphical information and/or pointer information to the plurality of image slices, color adjustment of the three-dimensional image, contrast adjustment of the three-dimensional image, inter-slice antialiasing for the three-dimensional image.

Moreover, optionally, the processing unit is configured to convert the plurality of image slices into a format (for example, such as a bit-plane format) that is compliant with that of the at least one projector and/or the multi-layer volumetric display.

The table-top volumetric display apparatus further comprises the at least one projector that is configured to project the plurality of image slices onto the plurality of display elements. Throughout the present disclosure, the term "projector" used herein relates to specialized equipment for projecting the plurality of image slices of the three-dimensional image upon the plurality of display elements of the multi-layer volumetric display.

Optionally, the at least one projector comprises a light source, a spatial light modulator and a projection arrangement, wherein when projecting a given image slice, the at least one projector is configured to:
 employ the light source to emit a light beam;
 employ the spatial light modulator to modulate the light beam; and
 employ the projection arrangement to direct the modulated light beam towards the multi-layer volumetric display.

In an embodiment, the term "fight source" relates to equipment that is used to emit the light beam therefrom. It will be appreciated that in operation, the light source is configured to emit the light beam of visible wavelength (namely, light of a wavelength that is visible to humans). Examples of the light source include, but are not limited to, at least one visible light-emitting diode, at least one visible light laser, a high intensity gas-discharge type bulb having color filters associated therewith.

Optionally, the light source is implemented by way of a plurality of light-emitting diodes configured to emit light of at least three wavelengths, wherein at least one first light emitting diode is configured to emit light having a first wavelength, at least one second light emitting diode is configured to emit light having a second wavelength and at least one third light emitting diode is configured to emit light having a third wavelength. Optionally, the second wavelength is greater than the first wavelength, but lesser than the third wavelength. As an example, the first wavelength may correspond to a blue color light (namely, a wavelength lying between 440 nanometers to 470 nanometers), the second wavelength may correspond to a green color light (namely, a wavelength lying between 520 nanometers to 550 nanometers), and the third wavelength may correspond to a red color light (namely, a wavelength lying between 610 nanometers to 650 nanometers). Alternatively, optionally, the second wavelength is greater than the third wavelength, but lesser than the first wavelength. As an example, the first wavelength may correspond to a red color light (namely, a wavelength lying between 610 nanometers to 650 nanometers), the second wavelength may correspond to a green color light (namely, a wavelength lying between 520 nanometers to 550 nanometers), and the third wavelength may correspond to a blue color light (namely, a wavelength lying between 440 nanometers to 470 nanometers).

Optionally, the light source is a truecolor light source. In such a case, the wavelength(s) of light emitted by the light source allow for rendition of truecolor within the displayed three-dimensional image. As an example, the light source may comprise a red color light emitting diode, a green color light emitting diode, and a blue color light emitting diode, wherein intensities of light emitted by the aforesaid light emitting diodes may be adjusted to provide truecolor within the displayed three-dimensional image.

In an embodiment, the term "spatial light modulator" relates to specialized equipment that is employed to modulate the light beam. In other words, the spatial light modulator is configured to adjust intensity and/or phase of the light beam in at least one spatial dimension. Furthermore, the spatial light modulator ensures encoding of graphical information represented in the plurality of image slices. Optionally, the spatial light modulator is implemented by way of at least one of: a digital micromirror device (DMD), a liquid crystal based spatial light modulator, a liquid crystal on silicon (LCos) based spatial light modulator. As an example, the spatial light modulator may be implemented by way of a ferroelectric liquid crystal based spatial light modulator having a high refresh rate.

Optionally, the at least one projector comprises a plurality of spatial light modulators that are employed to modulate light beams of different wavelengths substantially simultaneously.

Optionally, the light source and the spatial light modulator are integrated into a single unit. In such a case, the single unit functions as the light source as well as the spatial light modulator. Optionally, such a single unit is implemented by way of: an addressable micro-OLED array, an addressable solid state micro-LED array, a laser-based spatial light modulator.

Optionally, transversal spatial resolution of the three-dimensional image is directly related to the at least one projector (and specifically, to the spatial light modulator) used for projecting the plurality of image slices. Therefore, to increase the transversal spatial resolution of the three-dimensional image, each display element of the multi-layer volumetric display can be implemented by way of multiple optical diffusers, and a dedicated projector can be employed to project a given portion of the plurality of image slices upon at least one optical diffuser of a given display element. In an example, the multi-layer volumetric display may comprise 10 display elements wherein each display element is implemented by way of 4 optical diffusers. In such a case, there may be employed 4 projectors for projecting a specific portion of a given image slice upon a corresponding optical diffuser. As a result, the transversal spatial resolution of the three-dimensional image may be virtually quadrupled in comparison to utilization of a single projector. Therefore, affordable lower resolution spatial light modulators can be efficiently employed within the at least one projector. In another example, the multi-layer volumetric display may comprise 15 display elements wherein a given display element is implemented by way of 6 optical diffusers. In such a case, there may be employed 3 projectors for projecting a specific portion of a given image slice upon 2 corresponding optical diffusers.

In an embodiment, the term "projection arrangement" relates to an arrangement of optical components (for example, such as lenses, mirrors, prisms, apertures, and the like) that are configured to direct the modulated light beam towards the multi-layer volumetric display. Notably, the projection arrangement allows for sharply focusing the plurality of image slices upon the plurality of display elements. The projection arrangement provides a sufficient depth of field which encompasses the projection volume. As a result, sufficiently sharp images are displayed on the plurality of display elements. In an example, when a focusing distance of the projection arrangement is 1.55 meters, the projection arrangement may allow for sharply focusing the plurality of image slices upon a 100 millimeters deep stack of display elements. Furthermore, the projection arrangement may include an aperture to adjust at least a depth of field and a brightness of the plurality of image slices. Notably, adjustment of the depth of field of the plurality of image slices leads to adjustment of sharpness of the plurality of image planes, when the plurality of image planes are projected onto the plurality of display elements.

Optionally, the projection arrangement is implemented by way of active optical components which are electrically controllable to actively focus the plurality of image slices upon their corresponding display elements. Examples of such active optical components include, but are not limited to, liquid crystal-based electroactive lenses and electrostatically controllable membranes.

Furthermore, optionally, the projection arrangement allows for providing a substantially-constant magnification of the modulated light beam across the plurality of display elements of the multi-layer volumetric display.

Optionally, a refresh rate of the at least one projector is based upon the volumetric refresh rate of the multi-layer volumetric display and the number of the plurality of display elements. The refresh rate of the at least one projector can be understood to be a rate at which the plurality of image slices are projected by the at least one projector. Notably, the refresh rate of the at least one projector is a product of the volumetric refresh rate of the multi-layer volumetric display and the number of the plurality of display elements. As an example, if the multi-layer volumetric display comprises 20 display elements and the volumetric refresh rate of the multi-layer volumetric display is 50 volumes per second (or 50 Hz), the refresh rate of the at least one projector is equal to 1000 hertz (or 1 kilohertz).

Optionally, the spatial light modulator of the at least one projector has a substantially high refresh rate, corresponding to the refresh rate of the at least one projector. As an example, a digital micromirror device (DMD) having a very high refresh rate (for example, such as 25 kilohertz) may be employed within the at least one projector.

Optionally, the at least one projector is to be arranged in a manner that the light source of the at least one projector isn't directly visible to the user. Optionally, in this regard, the projection arrangement of the at least one projector is offset to allow for the light source of the at least one projector to be invisible to the user. Notably, in the table-top volumetric display apparatus, projections of the plurality of image slices are visible to the user whereas actual physical components (such as the light source) of the at least one projector are not visible to the user. Such a manner of arranging the at least one projector allows for minimizing appearance of "hotspots" which are unwanted images of the light source of the at least one projector. In other words the components are arranged in a manner that direct light from the projector arrangement is not directly visible for the user (typically not in line of sight). User is able to see only scattered light which forms the 3D image at the plurality of image slices.

According to an embodiment, the at least one projector is arranged as a rear projection arrangement with respect to the multi-layer volumetric display. In the rear projection arrangement, the at least one projector projects the plurality of image slices from a rear side of the multi-layer volumetric display, the rear side of the multi-layer volumetric display corresponding to a side of the multi-layer volumetric display that is farthest from the user. According to another embodiment, the at least one projector is arranged as a front projection arrangement with respect to the multi-layer volumetric display. In the front projection arrangement, the at least one projector projects the plurality of image slices from a front side of the multi-layer volumetric display, the front side of the multi-layer volumetric display corresponding to a side of the multi-layer volumetric display that is nearest from the user.

Optionally, the at least one projector is arranged to project the plurality of image slices towards a light steering arrangement wherefrom projections of the plurality of image slices are directed towards the plurality of display elements. In such a case, when the at least on projector is arranged as the rear projection arrangement with respect to the multi-layer volumetric display, the light steering arrangement directs the plurality of image slices towards the rear side of the multi-layer volumetric display. Similarly, when the at least on projector is arranged as the front projection arrangement with respect to the multi-layer volumetric display, the light steering arrangement directs the plurality of image slices towards the front side of the multi-layer volumetric display. Optionally, the light steering arrangement comprises at least one optical element arranged on an optical path of the modulated light beam, between the projection arrangement of the at least one projector and the multi-layer volumetric display. The at least one optical element allows for at least one of: collimating the modulated light beam, steering the modulated light beam, folding the optical path of the modulated light beam. Examples of the at least one optical element include, but are not limited to, a substantially-flat mirror, a substantially-curved mirror, a lens, and a prism.

Optionally, the at least one projector comprises a plurality of projectors that are configured to project a given image slice onto a corresponding display element in a complementary additive manner. In other words, the plurality of projectors project mutually complementing portions of the given image slice onto the corresponding display element in a manner that such portions collectively constitute the given image slice. Therefore, such portions, when projected by the plurality of projectors upon the corresponding display element, can be understood to 'add-up' to form an entirety of the given image slice. As an example, the table-top volumetric display apparatus may comprise 4 projectors that are configured to project 4 mutually complementing portions of the given image slice onto the corresponding display element. In such an example, the 4 mutually complementing portions additively constitute the given image slice.

Optionally, the table-top volumetric display apparatus further comprises a separation arrangement adjacent and substantially perpendicular to the multi-layer volumetric display, wherein the separation arrangement is to be employed to absorb unwanted reflections of light within the table-top volumetric display apparatus and/or to limit penetration of a projection of a given image slice intended for a given portion of a given display element into an adjacent portion of the given display element. The term "separation arrangement" used herein relates to an arrangement of at least one separating screen or at least one separating wall that separates unwanted light and desired light from one another. A material of the separation arrangement may have light absorptive and/or light reflective properties, thereby allowing for the separation arrangement to provide the aforesaid functionality. As an example, the separation arrangement could be a sheet or a wall of metal (for example, such as steel, aluminium and the like), plastic or composite material that is coated with a light absorptive material. When employed, the separation arrangement limits visibility of the hotspots whilst also absorbing the unwanted reflections of light from surroundings of the table-top volumetric display apparatus. Optionally, the separation arrangement is positioned adjacent and substantially perpendicular to a rear side of the multi-layer volumetric display, the rear side being opposite to a side of the multi-layer volumetric display that faces the user. It will be appreciated that the separation arrangement allows for physically dividing projection space corresponding to the at least one projector, based upon an arrangement of the at least one projector within the table-top volumetric display apparatus, in a manner that light intended to be incident upon separate portions of the plurality of display elements travels through separate spaces corresponding to the separate portions. As a result, light intended to be incident upon one portion of the plurality of display elements does not inter-mix substantially with light intended to be incident upon another portion of the plurality of display elements. Such a separation arrangement can be especially useful when the plurality of display elements are implemented by way of the plurality of optical diffusers arranged in the tiled manner since the projection space corresponding to the at least one projector can be efficiently divided to project light within separate regions.

In an example, the separation arrangement may be implemented by way of a single separating wall positioned adjacent and perpendicular to the rear side of the multi-layer volumetric display, in a manner that the projection space underneath the plurality of display elements is divided into two equal portions.

In another example, the separation arrangement may be implemented by way of two separating walls arranged substantially perpendicular to each other, and positioned adjacent and perpendicular to the rear side of the multi-layer volumetric display in a manner that the projection space underneath the plurality of display elements is divided into four equal portions.

Optionally, the at least one projector comprises a first projector and a second projector, the first projector and the second projector being arranged on opposite sides of the separation arrangement. In such a case, the separation arrangement can be understood to have divided the projection space underneath the plurality of display elements into two portions, and the first projector and the second projector are arranged on opposite sides of the separation arrangement in a manner that light projected from the first projector is to be incident upon one portion of the plurality of display elements whereas light projected from the second projector is to be incident upon the other portion of the plurality of display elements. In simpler terms, by way of the separation arrangement, light projected by the first and second projectors travels within separate sides of the separation arrangement.

Optionally, the first projector is configured to project a first portion of the plurality of image slices onto a first portion of the plurality of display elements, whereas the second projector is configured to project a second portion of the plurality of image slices onto a second portion of the plurality of display elements. Notably, in such a case, for any given image slice, its first portion and second portion collectively constitute an entirety of the given image slice. Therefore, in such a case, the first and second projectors project the first and second portions of the plurality of image slices in a manner that, when incident upon the first and second portions of the plurality of display elements, the plurality of image slices are fully displayed.

The table-top volumetric display apparatus further comprises the control unit coupled to the volumetric display driver, the processing unit and the at least one projector, wherein the control unit is configured to control the volumetric display driver and the at least one projector to present the three-dimensional image within the projection volume. The control unit is implemented by way of hardware, software, firmware, or a combination of these, that is configured to manage operations of at least the volumetric display driver and the at least one projector to present the three-dimensional image. In simpler terms, the control unit acts as a main control centre for various components of the table-top volumetric display apparatus. Notably, the control unit synchronously controls operation of the at least one projector, and the volumetric display driver so as to correctly project the plurality of image slices upon their corresponding display elements that lie at different positions within the projection volume. Furthermore, the control unit also manages time instants of projecting the plurality of image slices, and time durations of projecting the plurality of image slices. In operation, when a given image slice is to be projected onto a given display element, the control unit controls the volumetric display driver to switch the given display element to the optically diffusive operational state whilst switching all other display elements to the optically transparent state. Simultaneously, the control unit controls the at least one projector to project the given image slice towards the multi-layer volumetric display in a manner that the given image slice is correctly projected upon the given display element. It will be appreciated that the control unit allows for managing operation of the various components of the table-top volumetric display apparatus in a synchronized manner, thereby allowing for precise representation of the three-dimensional image within the projection volume.

Optionally, the control unit is coupled to the processing unit by way of at least one high throughput interface. The at least one high throughput interface could be wired or wireless. Notably, the at least one high throughput interface allows for communication between the control unit and the processing unit. However, since communication from the control unit to the processing may be very limited, there can optionally be utilized an ordinary communications interface (for example, such as a Universal Serial Bus (USB) interface, an auxiliary channel of the at least one high throughput interface, and the like) to enable communication from the control unit to the processing unit. Examples of the at least one high throughput interface include, but are not limited to, a DisplayPort interface, Thunderbolt® interface, a universal serial bus interface, a High Definition Multimedia Interface and a Wireless Gigabit Alliance Interface. It will be appreciated that multiple high throughput interfaces may be employed for obtaining extra bandwidth.

Optionally, the control unit receives the plurality of image slices from the processing unit, and processes the plurality of image slices to convert the plurality of image slices into a format (for example, such as a bit-plane format) that is required by the spatial light modulator of the at least one projector.

Optionally, the control unit comprises a light source driver for controlling operation of the light source of the at least one projector. The light source driver is configured to adjust at least one of: an intensity of the light beam that is to be emitted from the light source, a wavelength of the light beam that is to be emitted from the light source, a time instant and time duration of emitting the light beam from the light source. Optionally, the control unit and the light source driver are separate components that are coupled in communication with each other.

Optionally, the control unit comprises a spatial light modulator driver for controlling operation of the spatial light modulator. Furthermore, optionally, the spatial light modulator driver adjusts resolution of the spatial light modulator, thereby allowing for adjusting transversal spatial resolution of the three-dimensional image. The control unit manages a memory unit to ensure an uninterrupted supply of data for the spatial light modulator driver, thereby enabling the spatial light modulator driver to operate the spatial light modulator for providing a constant, uninterrupted refresh rate of the multi-layer volumetric display. Optionally, the control unit and the spatial light modulator driver are separate components that are coupled in communication with each other.

Optionally, the control unit is coupled in communication with the memory unit, the memory unit being configured to store the plurality of image slices that are generated by the processing unit. Furthermore, optionally, the memory unit is configured to store the three-dimensional image that is to be presented at the table-top volumetric display apparatus. Optionally, the memory unit is integrated with the control unit. Alternatively, optionally, the memory unit is integrated with the processing unit. In operation, optionally, the memory unit allows for asynchronous buffering of the plurality of image slices by utilizing a plurality of data buffers.

Optionally, the table-top volumetric display apparatus further comprises a power management module, the power management module being coupled to the control unit and the volumetric display driver, wherein the power management module, in operation, distributes electrical power from a power source to the control unit and the volumetric display driver. Thereafter, the control unit distributes the electrical power to other electronic components (for example, such as the light source driver, the spatial light modulator driver, the processing unit, and the like) of the table-top volumetric display apparatus, whereas the volumetric display driver provides the electrical power to the at least one optical diffuser of the plurality of display elements. Optionally, the power management module can be integrated with the control unit. In operation, the power management module may provide 12 volts electrical supply to the control unit and may provide 150 volts-200 volts electrical supply to the volumetric display driver.

Optionally, the processing unit is communicably coupled to an external image source, the processing unit being configured to obtain a sequence of three-dimensional images from the external image source, and to process individual three-dimensional images of the sequence to generate corresponding image slices, for presenting the sequence of three-dimensional images within the projection volume in real or near-real time. In such a case, the external image source could be an imaging system (for example, such as cameras mounted on robots or drones), a database arrangement, a multimedia streaming service, and the like. The sequence of three-dimensional images would constitute a three-dimensional video (for example, such as a three-dimensional tutorial, a three-dimensional game environment, a three-dimensional simulation, and the like). It will be appreciated that the terms "real time" and "near-real time" relate to a time interval for displaying the sequence of three-dimensional images in a way that no apparent delay is observed by user when using the table-top volumetric display apparatus. As an example, a time lag between obtaining the sequence of three-dimensional images and presenting the sequence of three-dimensional images should be minimal so that the user's viewing experience is undisturbed.

Optionally, the external image source is coupled in communication with the memory unit, wherein the memory unit is configured to store the sequence of three-dimensional images.

Optionally, the processing unit is communicably coupled to a plurality of external image sources, the processing unit being configured to obtain a plurality of data feeds from the plurality of external image sources, and to process the plurality of data feeds to generate a composite three-dimensional image within the projection volume.

Optionally, the processing unit is configured to process a given image slice that is to be projected onto a given display element in a manner that graphical information represented in the given image slice is entirely displayable within a useable fill region of the given display element. Generally, the given image slice is projected by the at least one projector at an angle to the multi-layer volumetric display. Notably, the given image slice has a substantially similar aspect ratio to that of the spatial light modulator of the at least one projector. In operation, the graphical information of the given image slice is to be entirely displayed at its corresponding display element. However, with increase in angular optical distance between the given display element and the at least one projector, a given light beam of the given image slice widens, thereby possible overfilling the effective area of the corresponding optical diffuser (thus potentially loseing some information). As a result, some portion of graphical information represented in the given image slice is susceptible to being lost. Since loss of any graphical information represented in the given image slice is undesirable, the processing unit processes the given image slice prior to its projection in a manner that there would be no loss of graphical information, even if the given image slice is projected at an angle to the multi-layer volumetric display. Specifically, whilst processing the given image slice in the aforesaid manner, the graphical information represented in the given image slice is scaled down and/or shifted within the given image slice in a manner that when projected, no part of the graphical information would be incident outside of the usable fill region of the given display element. Therefore, upon such processing of the given image slice by the processing unit, a portion of the given image slice represents the entire graphical information whereas a remaining portion of the given image slice is devoid of any graphical information. As a result, when the given image slice is projected towards the given display element after processing, the portion of the given image slice that represents the graphical information is entirely displayed within the usable fill region of the given display element. It will be appreciated that the useable fill region of the given display element relates to a region of the given display element that can be actually employed to display graphical information. The usable fill region of the given display element generally corresponds to 70 to 100 percent of a total area of the given image slice, such correspondence being based upon the angular optical distance between the given display element and the at least one projector.

Optionally, when each of the plurality of display elements is implemented by way of the plurality of optical diffusers, the processing unit is configured to process different portions of a given image slice that are to be projected onto different optical diffusers of the plurality of optical diffusers in a manner that graphical information represented in one portion of the given image slice is entirely displayable within a useable fill region of a corresponding optical diffuser. In such a case, when processing the different portions of the given image slice, the graphical information represented in the different portions of the given image slice is scaled down and/or shifted within the given image slice in a manner that when projected, the graphical information represented in the different portions of the given image slice is represented only at its corresponding optical diffuser. In other words, no part of graphical information represented in a given portion of the given image slice would be incident outside of the usable fill region of its corresponding optical diffuser. As a result, crosstalk of graphical information outside of requisite optical diffusers is avoided.

Optionally, the processing unit is configured to process the given image slice based upon an angular width of the useable fill region of the given display element. Notably, the angular width of the useable fill region of the given display element relates to an angle at which a projection of the given image slice is directed upon the given display element, as well as a distance between the at least one projector or the light steering arrangement and the given display element. In other words, a difference in fill factor of the nearest display element and the farthest display element from the at least one projector is proportional to a ratio of cut-off length to all possible active length. Therefore, the nearest display element to the projector can represent a higher spatial pixel density of the graphical information represented in the given image slice as compared to the farthest display element from the projector, even without any of the aforesaid digital processing. In such a scenario, without any of the aforesaid digital processing, an amount of displayable graphical information for a given display element varies with depth position of the given display element within the multi-layer volumetric display. In order to overcome this limitation, the given image slice can be suitably processed digitally, based upon the angular width of the useable fill region of the given display element, so as to represent entire graphical information of the given image slice on its corresponding display element, irrespective of the depth position such a display element.

Optionally, the table-top volumetric display apparatus further comprises at least one input device coupled to the processing unit, wherein the at least one input device, in operation, allows the user to provide an input to interactively control image content that is presented via the table-top volumetric display apparatus, further wherein the processing unit is configured to process the three-dimensional image to generate the plurality of image slices, based upon the user's input. In such an instance, the user can operate the at least one input device to manage image content that is presented via the table-top volumetric display apparatus. For example, the user can add or remove image content for presentation, as well as modify existing content that is being presented at the table-top volumetric display apparatus by utilizing the at least one input device. Therefore, the processing unit generates the plurality of image slices based upon the user's input, to present the three-dimensional image. It will be appreciated that upon receiving the user's input, the user's input is processed by the processing unit and the plurality of image slices are generated according to the user's input, in real or near-real time. As a result, the user's experience of interaction with the table-top volumetric display apparatus is smooth and substantially free from visual lag.

Optionally, the at least one input device is implemented by way of at least one of: a depth camera, a trackball, a joystick, a keyboard, a mouse, a touchpad, a stylus, a microphone, an electronic whiteboard, a haptic input device. More optionally, the at least one input device has a high number of degrees of freedom. Sophisticated input devices having a high number of degrees of freedom allow for a high degree of user control of the interactive image content. In an example, the at least one input device may be a three-dimensional stylus or a SpaceMouse® with 6 degrees of freedom.

Optionally, the input of the user is in a form of at least one of: a gesture, an audio signal, a haptic signal. In other words, the table-top volumetric display apparatus can receive the user's input in at least one form. Optionally, such forms of user input are converted into electrical signals by the at least one input device and subsequently transmitted to the processing unit. As an example, the user may employ at least one depth camera (input device) to provide his/her input in the form of gestures. As another example, the user may employ at least one microphone (input device) to provide his/her input in the form of audio signals (namely, voice signals). As yet another example, the user may employ at least one touchpad to provide input in the form of haptic signals.

Optionally, the table-top volumetric display apparatus allows the user to perform at least one of: zoom control of the three-dimensional image, resizing of the three-dimensional image, color adjustment of the three-dimensional image, brightness adjustment of the three-dimensional image, addition and/or removal of a graphical object within the three-dimensional image, movement of the three-dimensional image. As an example, the user may perform zoom control such as zoom-in or zoom-out of the three-dimensional image by way of a gesture input. In such a case, when the user zooms into a region of interest within the three-dimensional image, the three-dimensional image may be modified to correspond to the user's region of interest, and image slices corresponding to the modified three-dimensional image may be generated and projected upon the plurality of display elements to represent the region of interest at a higher overall (depth and transversal) resolution. As another example, the user may move the three-dimensional image by way of another gesture input. In such a case, the movement could include at least one of: rotation of the three-dimensional image, tilting of the three-dimensional image, translation of the three-dimensional image. As yet another example, the user may adjust colors within the three-dimensional image by way of haptic input via at least one touchpad. For example, the user may change a truecolor image to grayscale.

Optionally, the table-top volumetric display apparatus further comprises at least one output device coupled to the processing unit, wherein the at least one output device, in operation, allows the user to receive an output from the table-top volumetric display apparatus, the at least one output device being implemented by way of at least one of: a speaker, a haptic output device. In such a case, the user's interactive experience of the table-top volumetric display apparatus is substantially enhanced. Examples of the haptic output device include, but are not limited to, haptic gloves, haptic bracelets, haptic ornaments, haptic footwear and haptic clothing. In an example, the speaker may provide an audio input to the user when there is any change in the three-dimensional image (for example, according to the user's input) that is being presented at the table-top volumetric display apparatus. In another example, the user may be provided with haptic outputs by way of at least one haptic device when he/she touches an outer surface of the table-top volumetric display apparatus.

Optionally, the table-top volumetric display apparatus is implemented as an integrated unit including at least the multi-layer volumetric display, the volumetric display driver, the processing unit, the at least one projector and the control unit within a single housing. More optionally, the integrated unit of the table-top volumetric display apparatus includes at least one of: the separation arrangement, the at least one input device, the at least one output device. It will be appreciated that the integrated unit implementation of the table-top volumetric display apparatus allows for making the table-top volumetric display apparatus portable and conveniently usable by any number of users. In such a case, the integrated unit acts as a complete workstation for the user. Optionally, the integrated unit is equipped with a steering mechanism (for example, such as wheels). As a result, the integrated unit of the table-top volumetric display apparatus is easily movable.

It will be appreciated that the table-top volumetric display apparatus of the present disclosure truthfully represents three-dimensional content and can therefore be employed in various application areas, for example, such as military, education, medicine, transportation, architecture, engineering, and so forth. In an example, the table-top volumetric display apparatus can be used in the military domain in place of sand tables for displaying dynamic three-dimensional content with ease. In such an example, the table-top volumetric display apparatus can be employed to present three-dimensional images of military equipment (such as weapons, vehicles, and the like), topography, and the like. In another example, the table-top volumetric display apparatus can be used in the education domain for showing working of certain equipment to students, illustrating scientific concepts to the students, showing manufacturing facilities and/or laboratories to the students, and the like. In yet another example, the table-top volumetric display apparatus can be used in the medical domain for simulating surgical procedures in surgery planning, analyzing laboratory test reports of a patient, viewing anatomical models of the patient, and so forth.

The present disclosure also relates to the method as described above. Various embodiments and variants disclosed above apply mutatis mutandis to the method.

Optionally, the method further comprises processing a given image slice that is to be projected onto a given display element in a manner that graphical information represented in the given image slice is entirely displayable within a useable fill region of the given display element.

Optionally, the method further comprises processing the given image slice based upon an angular width of the useable fill region of the given display element.

Optionally, in the method, the at least one projector comprises a plurality of projectors, the method comprising projecting, via the plurality of projectors, a given image slice onto a corresponding display element in a complementary additive manner.

Optionally, the method further comprises processing the three-dimensional image to generate the plurality of image slices based upon a user's input.

Optionally, the method further comprises allowing, via at least one input device of the table-top volumetric display apparatus, the user to perform at least one of: zoom control of the three-dimensional image, resizing of the three-dimensional image, color adjustment of the three-dimensional image, brightness adjustment of the three-dimensional image, addition and/or removal of a graphical object within the three-dimensional image, movement of the three-dimensional image.

Optionally, the method further comprises obtaining a sequence of three-dimensional images from an external image source, and processing individual three-dimensional images of the sequence to generate corresponding image slices, for presenting the sequence of three-dimensional images within the projection volume in real or near-real time.

DETAILED DESCRIPTION OF THE DRAWINGS

Referring to FIG. 1, illustrated is a schematic illustration of an environment 100 for using a table-top volumetric display apparatus 102, in accordance with an embodiment of the present disclosure. As shown, the environment 100 depicts the table-top volumetric display apparatus 102 being used by a plurality of users (depicted as a first user 104, a second user 106 and a third user 108). In the environment 100, the table-top volumetric display apparatus 102 presents a three-dimensional image 110 that is viewed by the first user 104, the second user 106 and the third user 108. Notably, the first user 104, the second user 106 and the third user 108 can move freely around the table-top volumetric display apparatus 102 to visualize the three-dimensional image 110 from different perspectives.

Figure 2A:
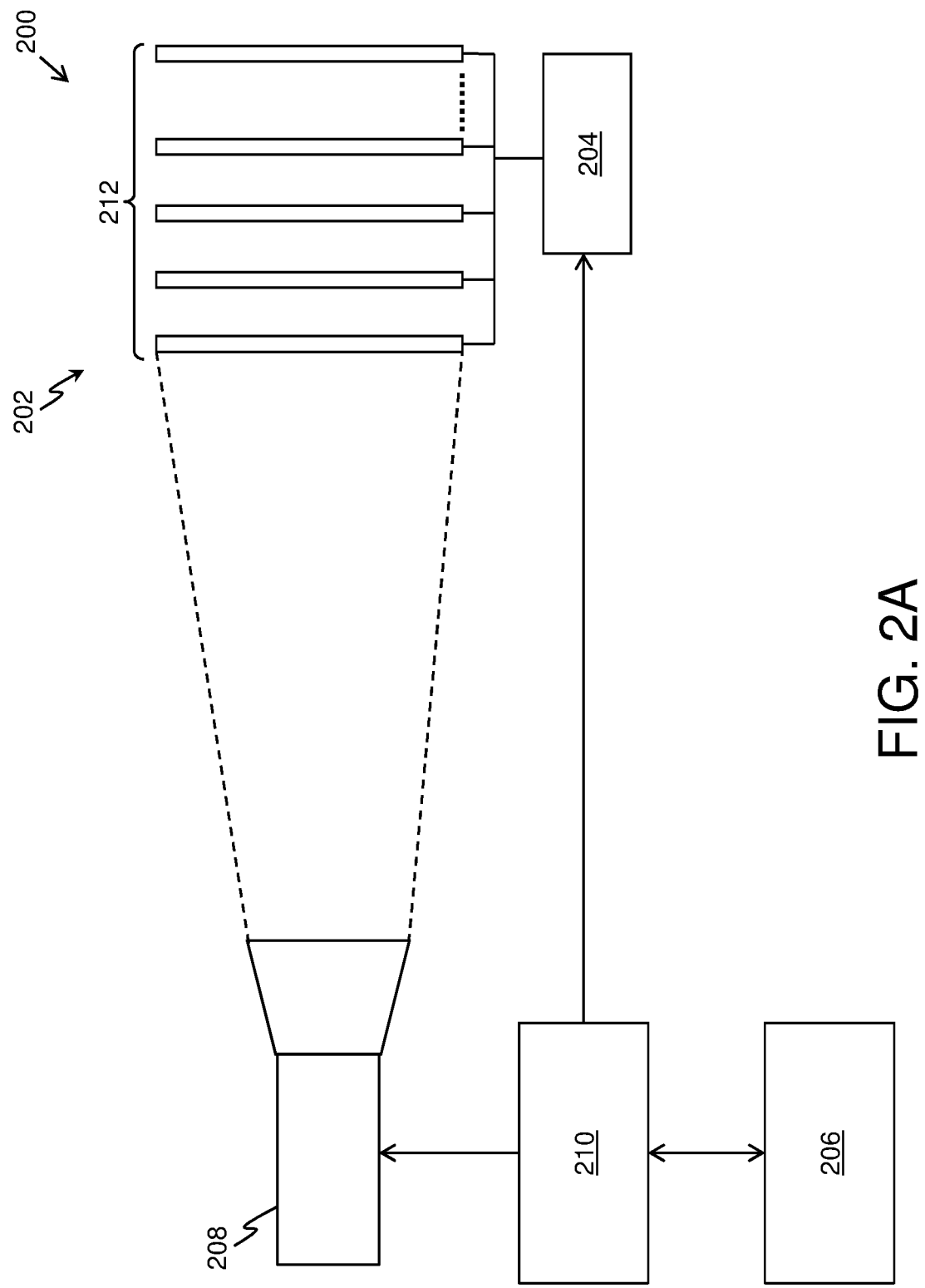
FIGS. 2A and 2B are schematic illustrations of a table-top volumetric display apparatus for presenting a three-dimensional image, in accordance with different embodiments of the present disclosure.
Figure 2B:
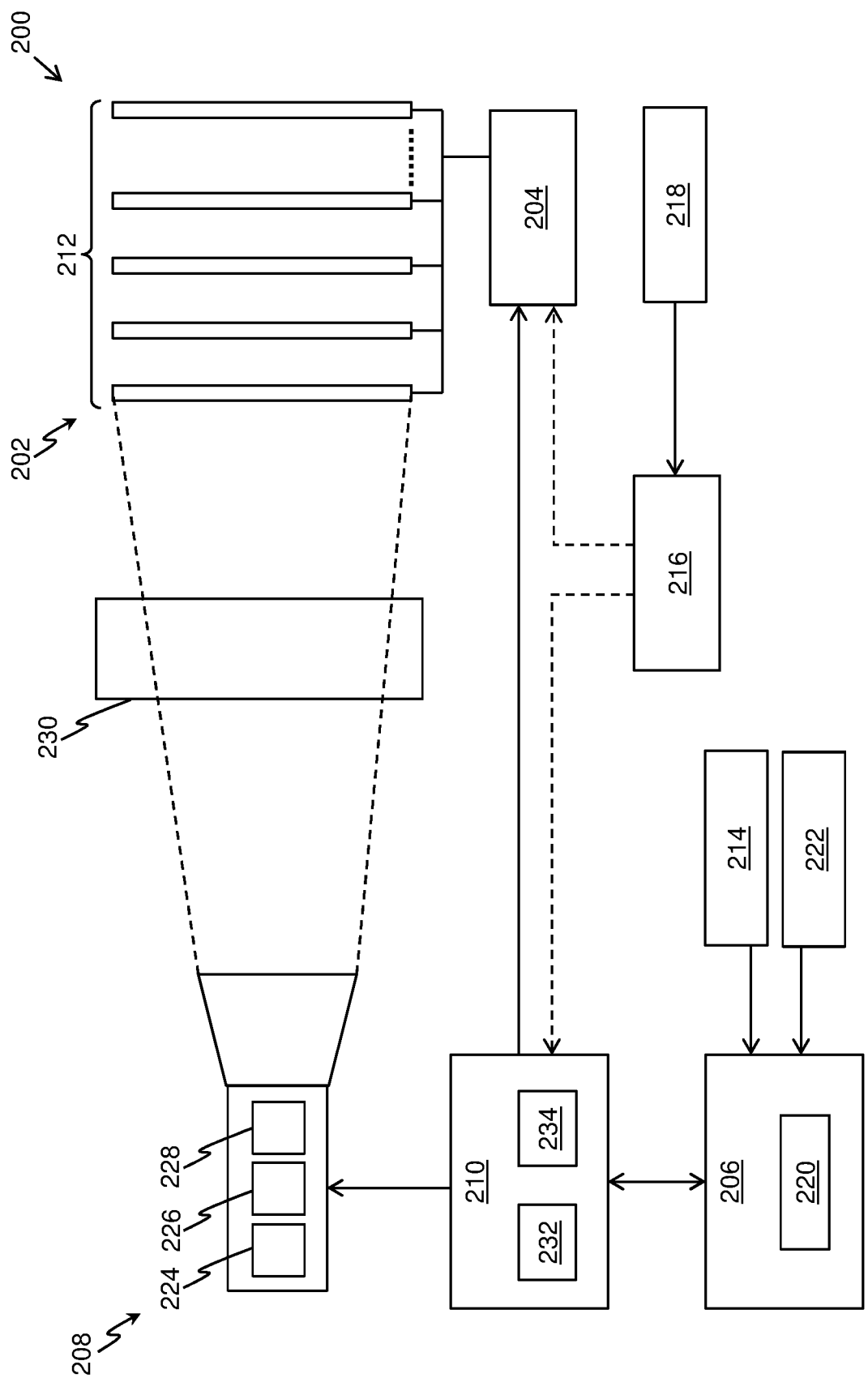

Referring to FIGS. 2A and 2B, illustrated are schematic illustrations of a table-top volumetric display apparatus 200 for presenting a three-dimensional image, in accordance with different embodiments of the present disclosure. It may be understood by a person skilled in the art that the FIGS. 2A and 2B include simplified schematic illustrations of the table-top volumetric display apparatus 200 for sake of clarity only, which should not unduly limit the scope of the claims herein. The person skilled in the art will recognize many variations, alternatives, and modifications of embodiments of the present disclosure.

As shown in FIGS. 2A and 2B, the table-top volumetric display apparatus 200 comprises a multi-layer volumetric display 202, a volumetric display driver 204 coupled to the multi-layer volumetric display 202, a processing unit 206, at least one projector (depicted as a projector 208) and a control unit 210 coupled to the volumetric display driver 204, the processing unit 206 and the projector 208. The multi-layer volumetric display 202 comprises a plurality of display elements 212, the plurality of display elements 212 being arranged substantially parallelly to form a projection volume, each of the plurality of display elements 212 being implemented by way of at least one optical diffuser (not shown). The volumetric display driver 204 is configured to control operational states of the plurality of display elements 212. The processing unit 206 is configured to process the three-dimensional image to generate a plurality of image slices, wherein a given image slice is to be projected onto a corresponding display element. The projector 208 is configured to project the plurality of image slices onto the plurality of display elements 212. The control unit 210 is configured to control the volumetric display driver 204 and the projector 208 to present the three-dimensional image within the projection volume.

As shown in FIG. 2B, the table-top volumetric display apparatus 200 further comprises at least one input device (depicted as an input device 214) coupled to the processing unit 206. The input device 214, in operation, allows a user to provide an input to interactively control image content that is presented via the table-top volumetric display apparatus 200, further wherein the processing unit 206 is configured to process the three-dimensional image to generate the plurality of image slices, based upon the user's input. Furthermore, the table-top volumetric display apparatus 200 is shown to comprise a power management module 216, the power management module 216 being coupled to the volumetric display driver 204 and the control unit 210, wherein the power management module 216, in operation, distributes electrical power from a power source 218 to the volumetric display driver 204 and the control unit 210. Furthermore, the processing unit 206 comprises at least one graphics processing unit (depicted as a graphics processing unit 220) configured to process the three-dimensional image to generate the plurality of image slices. Moreover, the processing unit 206 is communicably coupled to an external image source 222, wherein the processing unit 206 being configured to obtain a sequence of three-dimensional images from the external image source 222, and to process individual three-dimensional images of the sequence to generate corresponding image slices, for presenting the sequence of three-dimensional images within the projection volume in real or near-real time. Furthermore, the projector 208 comprises a light source 224, a spatial light modulator 226 and a projection arrangement 228, wherein when projecting the given image slice, the projector 208 is configured to employ the light source 224 to emit a light beam, employ the spatial light modulator 226 to modulate the light beam and employ the projection arrangement 228 to direct the modulated light beam towards the multi-layer volumetric display 202. Moreover, the projector 208 is arranged to project the plurality of image slices towards a light steering arrangement 230 wherefrom projections of the plurality of image slices are directed towards the plurality of display elements 212. Furthermore, the control unit 210 comprises a light source driver 232 for controlling operation of the light source 224 of the projector 208 and a spatial light modulator driver 234 for controlling operation of the spatial light modulator 226.

Figure 3A:
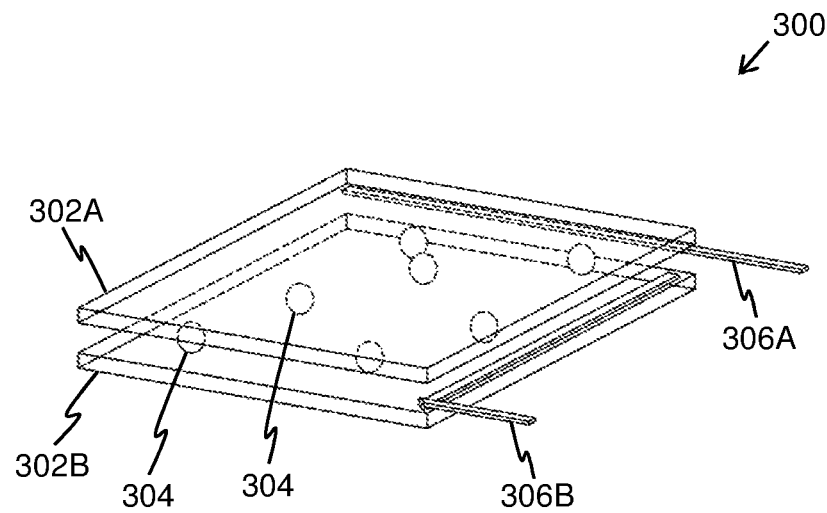
FIGS. 3A and 3B illustrate a schematic view and a top view of a given optical diffuser respectively, in accordance with an embodiment of the present disclosure.
Figure 3B:
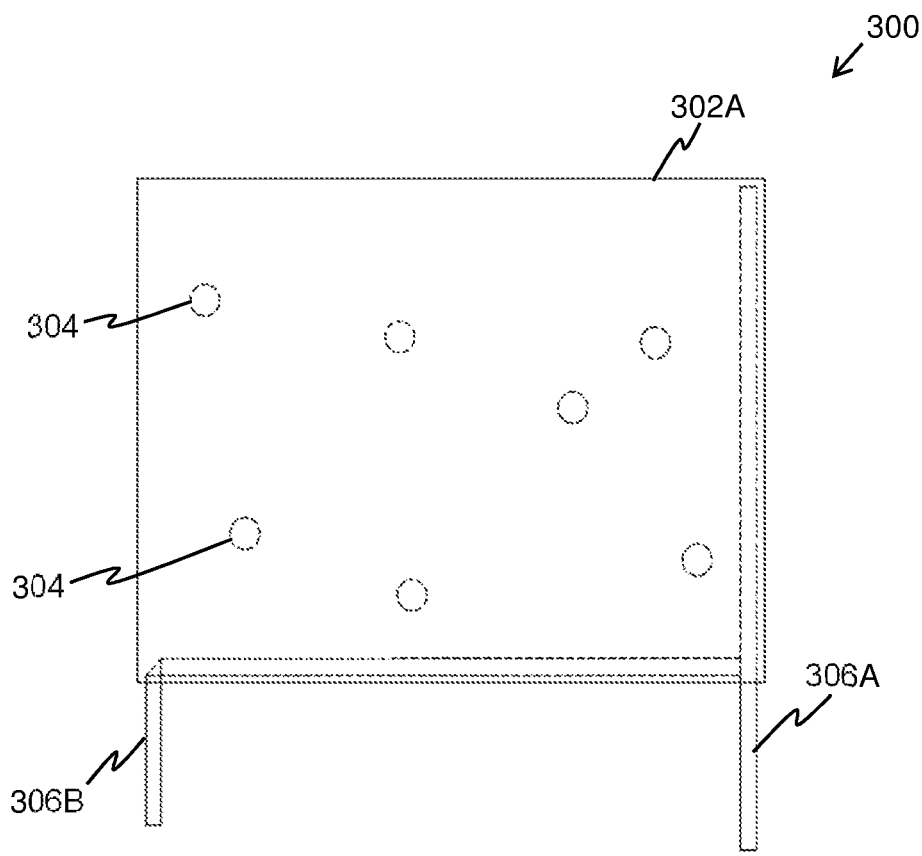

Referring to FIGS. 3A and 3B, illustrated a schematic view and a top view of a given optical diffuser 300 respectively, in accordance with an embodiment of the present disclosure. It may be understood by a person skilled in the art that the FIGS. 3A and 3B include simplified views of the given optical diffuser 300 for sake of clarity only, which should not unduly limit the scope of the claims herein. The person skilled in the art will recognize many variations, alternatives, and modifications of embodiments of the present disclosure.

As shown in FIGS. 3A and 3B, the given optical diffuser 300 comprises two supporting substrates (depicted as a supporting substrate 302A and a supporting substrate 302B), a plurality of spacers (depicted as spacers 304), an electro-optically active medium (not shown) between the two supporting substrates 302A-B, at least one polymeric seal (not shown) along a periphery of the two supporting substrates 302A-B and electrically conductive busbars (depicted as an electrically conductive busbar 306A and an electrically conductive busbar 306B) that in operation, provide electrical power to the two supporting substrates 302A-B. The two supporting substrates 302A-B are arranged substantially parallelly to each other, wherein inwardly facing surfaces of the two supporting substrates 302A-B are coated with a transparent electrode material. Furthermore, outwardly facing surfaces of the two supporting substrates 302A-B could be coated with an anti-reflective material. The spacers 304 are arranged between the two supporting substrates 302A-B to provide a substantially uniform separation of the two supporting substrates 302A-B. The at least one polymeric seal is employed to contain the electro-optically active medium within the given optical diffuser 300. Notably, the electrically conductive busbars 306A-B are arranged in an L-shape configuration along edges of the given optical diffuser 300, to allow for minimal viewing obstruction.

Figure 4A:
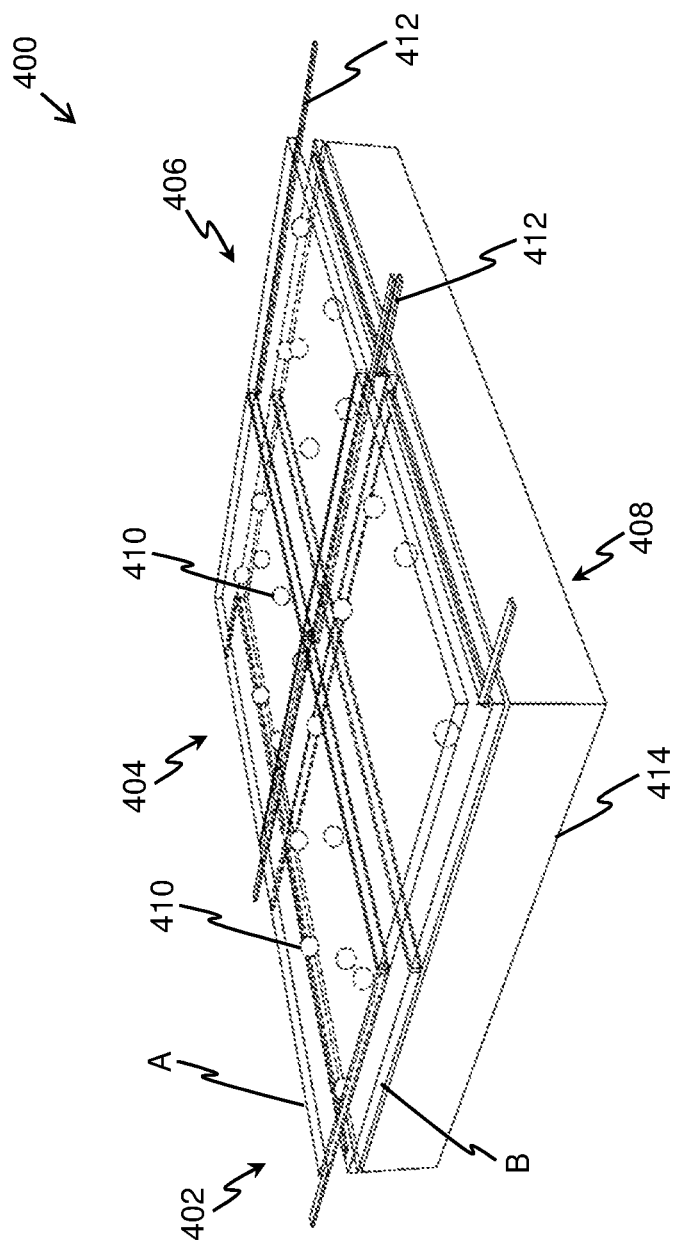
FIGS. 4A and 4B illustrate a schematic view and a top view of a given display element respectively, in accordance with an embodiment of the present disclosure.
Figure 4B:
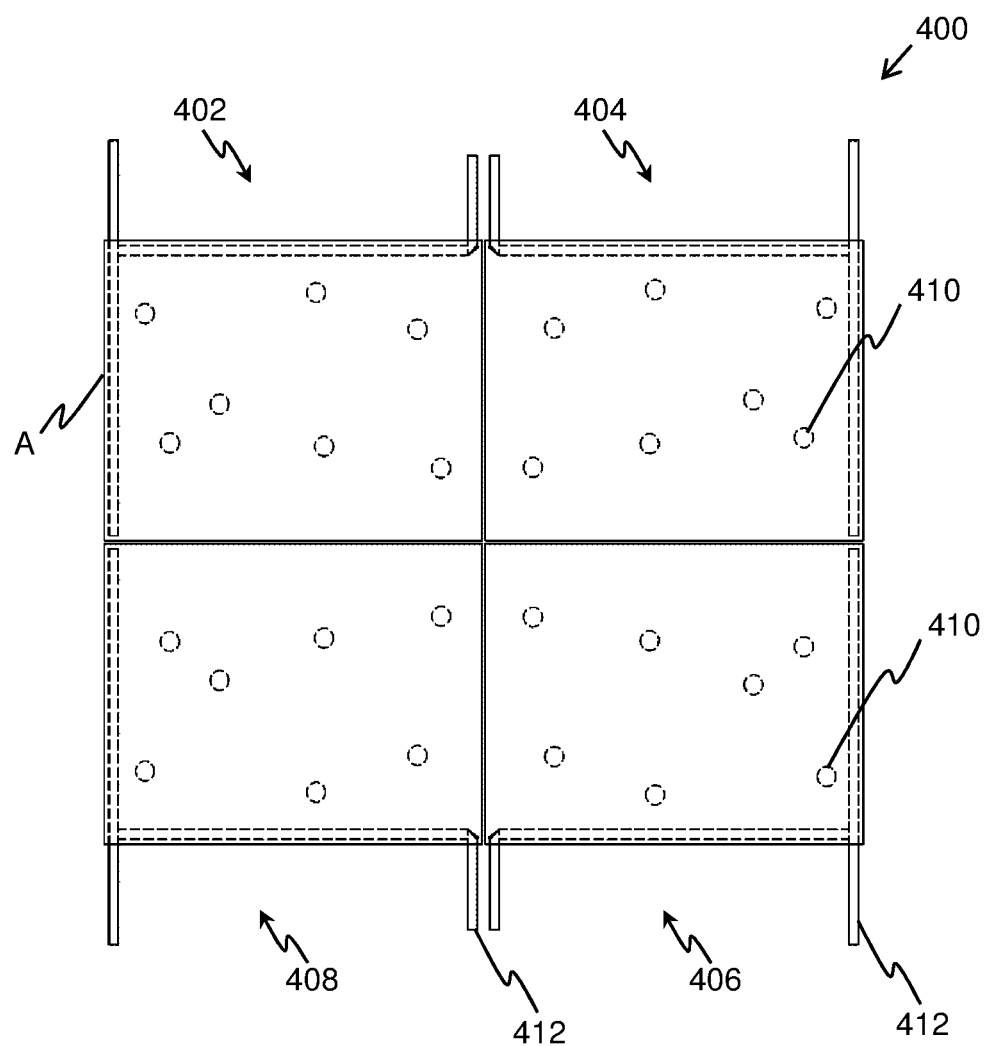

Referring to FIGS. 4A and 4B, illustrated a schematic view and a top view of a given display element 400 respectively, in accordance with an embodiment of the present disclosure. It may be understood by a person skilled in the art that the FIGS. 4A and 4B include simplified views of the given display element 400 for sake of clarity only, which should not unduly limit the scope of the claims herein. The person skilled in the art will recognize many variations, alternatives, and modifications of embodiments of the present disclosure.

As shown in FIGS. 4A and 4B, the given display element 400 is implemented by way of a plurality of optical diffusers (depicted as an optical diffuser 402, an optical diffuser 404, an optical diffuser 406 and an optical diffuser 408) arranged in a tiled manner. The optical diffusers 402, 404, 406 and 408 comprises two supporting substrates (depicted as a supporting substrate A and a supporting substrate B), a plurality of spacers (depicted as spacers 410), an electro-optically active medium (not shown) between the supporting substrate A and the supporting substrate B, at least one polymeric seal (not shown) along a periphery of the supporting substrate A and the supporting substrate B and electrically conductive busbars 412 that in operation, provide electrical power to the supporting substrate A and the supporting substrate B. In each of the optical diffusers 402-408, the electrically conductive busbars 412 are arranged in an L-shape configuration along edges of the corresponding optical diffuser. Furthermore, in the depicted tiled arrangement, the electrically conductive busbars 412 are placed along a periphery of the tiled arrangement of the plurality of optical diffusers 402-408. Notably, since the electrically conductive busbars 412 are generally non-transparent to visible light, they are placed along the periphery of the tiled arrangement to allow for minimally obstructing a user's view when such tiled arrangement is used within a multi-layer volumetric display.

As shown in FIG. 4A, there is shown a supporting slab 414 corresponding to the given display element 400, wherein the supporting slab 414 is employed to support the optical diffusers 402, 404, 406 and 408 of the given display element 400. The supporting slab 414 provides positional accuracy as well as rigidity to the given display element 400. It will be appreciated that the multi-layer volumetric display includes a plurality of supporting slabs corresponding to a plurality of display elements.

Figure 5A:
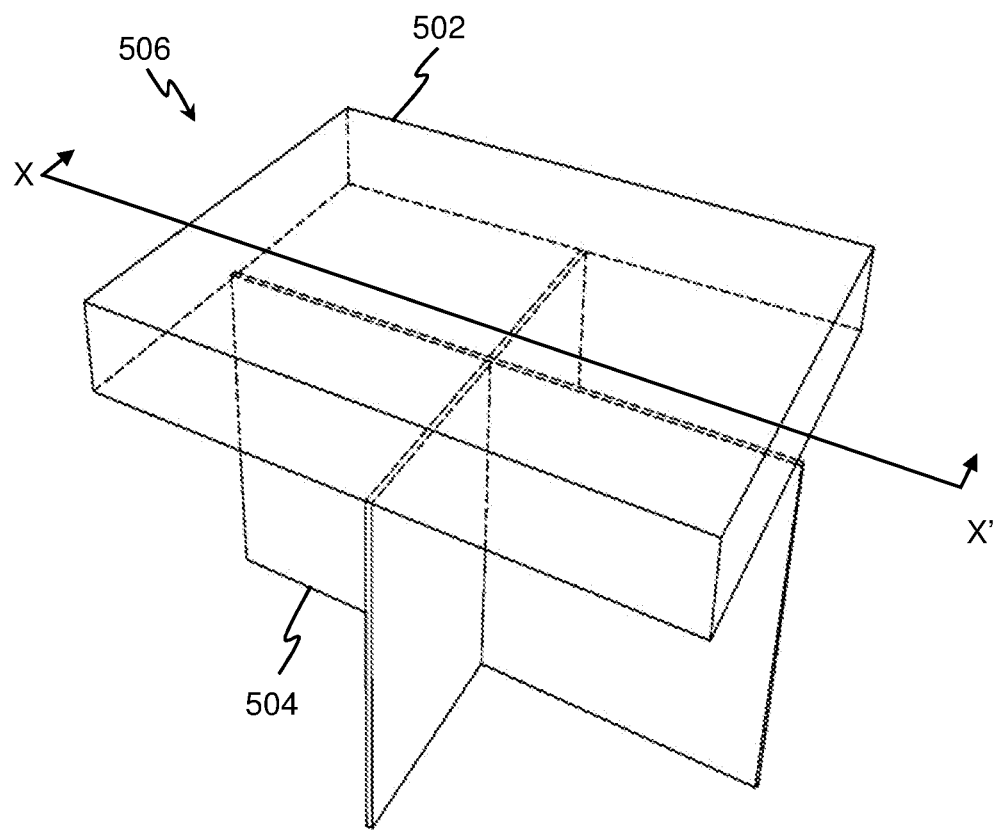
FIGS. 5A and 5B illustrate different views of an arrangement of a multi-layer volumetric display and a separating arrangement within a table-top volumetric display apparatus, in accordance with an embodiment of the present disclosure.
Figure 5B:
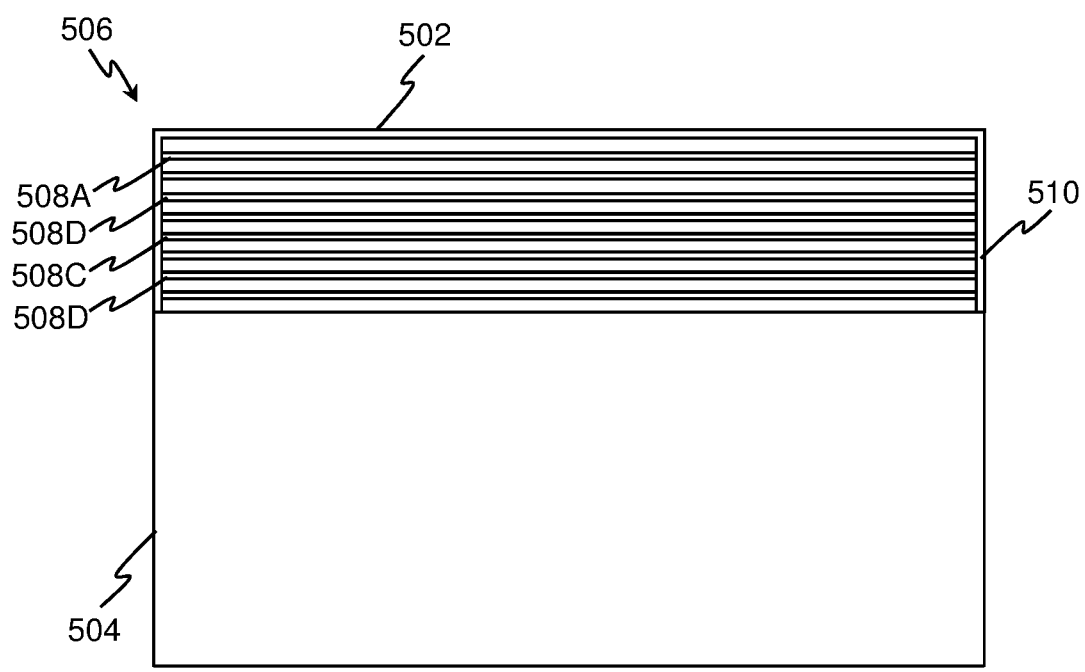

Referring to FIGS. 5A and 5B illustrate different views of an arrangement of a multi-layer volumetric display 502 and a separation arrangement 504 within a table-top volumetric display apparatus 506, in accordance with an embodiment of the present disclosure. It may be understood by a person skilled in the art that the FIGS. 5A and 5B include simplified views of the arrangement for sake of clarity only, which should not unduly limit the scope of the claims herein. The person skilled in the art will recognize many variations, alternatives, and modifications of embodiments of the present disclosure.

As shown in FIG. 5A, illustrated is a schematic view of the arrangement of the multi-layer volumetric display 502 and the separation arrangement 504 within the table-top volumetric display apparatus 506. The separation arrangement 504 is arranged adjacent and substantially perpendicular to the multi-layer volumetric display 502, wherein the separation arrangement 504 is to be employed to absorb unwanted reflections of light within the table-top volumetric display apparatus 506 and/or to limit penetration of a projection of a given image slice intended for a given portion of a given display element into an adjacent portion of the given display element. Notably, the separation arrangement 504 is arranged adjacent and substantially perpendicular to a rear side (which is opposite to a viewing perspective of a user) of the table-top volumetric display apparatus 506.

As shown in FIG. 5B, illustrated is a view of a cross-section of the arrangement of the multi-layer volumetric display 502 and the separating arrangement 504 within the table-top volumetric display apparatus 506 along an axis X-X'. The multi-layer volumetric display 502 comprises a plurality of display elements (depicted as display elements 508A, 508B, 508C, and 508D) arranged substantially parallelly to form a projection volume. Furthermore, the display elements 508A, 508B, 508C, and 508D are arranged in a stacked manner. As shown, the multi-layer volumetric display 502 further comprises at least one protective cover 510 employed to protect the display elements 508A, 508B, 508C, and 508D.

Figure 6:
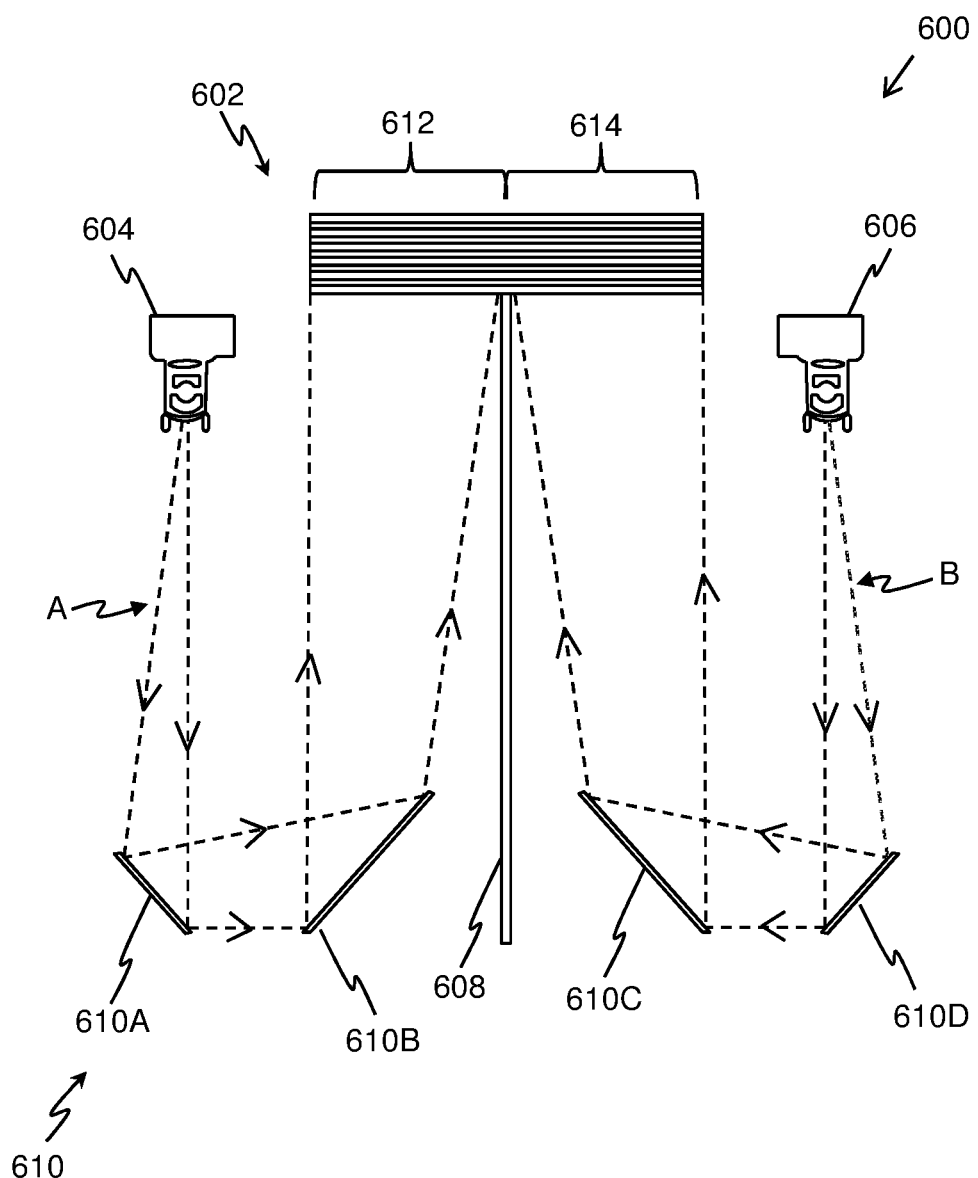
FIG. 6 illustrates an exemplary implementation of a table-top volumetric display apparatus for presenting a three-dimensional image, in accordance with an embodiment of the present disclosure.

Referring to FIG. 6, illustrated is an exemplary implementation of a table-top volumetric display apparatus 600 for presenting a three-dimensional image, in accordance with an embodiment of the present disclosure. The table-top volumetric display apparatus 600 comprises a multi-layer volumetric display 602 comprising a plurality of display elements, a volumetric display driver (not shown) coupled to the multi-layer volumetric display 602, a processing unit (not shown), at least one projector (depicted as a first projector 604 and a second projector 606) and a control unit (not shown) coupled to the volumetric display driver, the processing unit, the first projector 604 and the second projector 606. As shown, the table-top volumetric display apparatus 600 further comprises a separation arrangement 608 and a light steering arrangement 610. The first projector 604 and the second projector 606 are arranged to project the plurality of image planes towards the light steering arrangement 610 wherefrom projections of the plurality of image planes are directed towards the plurality of display elements. As shown, the light steering arrangement 610 comprises at least one optical element (depicted as an optical element 610A, an optical element 610B, an optical element 610C, and an optical element 610D) arranged on optical paths of modulated light beams (depicted as a light beam A from the first projector 604 and a light beam B from the second projector 606), between the projection arrangement of the first and second projectors 604 and 606 and the multi-layer volumetric display. Furthermore, the first projector 604 and the second projector 606 are arranged on opposite sides of the separation arrangement 608, wherein the first projector 604 is configured to project a first portion of a plurality of image slices onto a first portion 612 of the plurality of display elements, and the second projector 606 is configured to project a second portion of the plurality of image slices onto a second portion 614 of the plurality of display elements.

Figure 7:
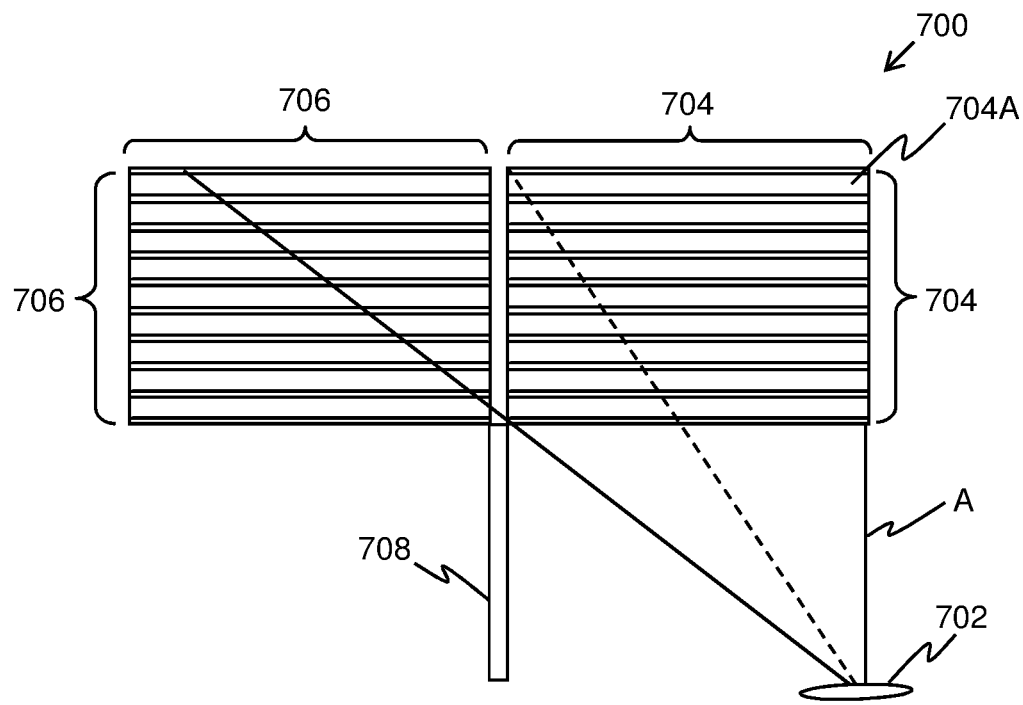
FIG. 7 illustrates an exaggerated view of a cross-section of a multi-layer volumetric display whilst receiving a projection of a portion of a given image slice from a projector, in accordance with an embodiment of the present disclosure.

Referring to FIG. 7, illustrated is an exaggerated view of a cross-section of a multi-layer volumetric display 700 whilst receiving a projection A of a portion of given image slice from a projector (not shown), in accordance with an embodiment of the present disclosure. The multi-layer volumetric display 700 is shown to comprise a plurality of display elements being implemented by way of a plurality of optical diffusers arranged in a tiled manner. As shown, the projection A of a portion of the given image slice is directed from a light steering unit (and specifically, from an optical element 702 of the light steering unit) towards a given optical diffuser 704A among a set 704 of optical diffusers. Notably, there is arranged a separation arrangement 708 between the sets 704 and 706 of optical diffusers. However, the projection A that is intended to be incident upon the given optical diffuser 704A of the set 704, is also incident upon neighboring optical diffuser(s) of the set 706. Therefore, in such a case, the processing unit is configured to process the portion of the given image slice corresponding to the projection A in a manner that graphical information represented in such a portion of the given image slice is entirely displayable within a useable fill region of its corresponding optical diffuser 704A. Such processing of the given image slice is based upon an angular width of the useable fill region of the given optical diffuser 704A.

Figure 8:
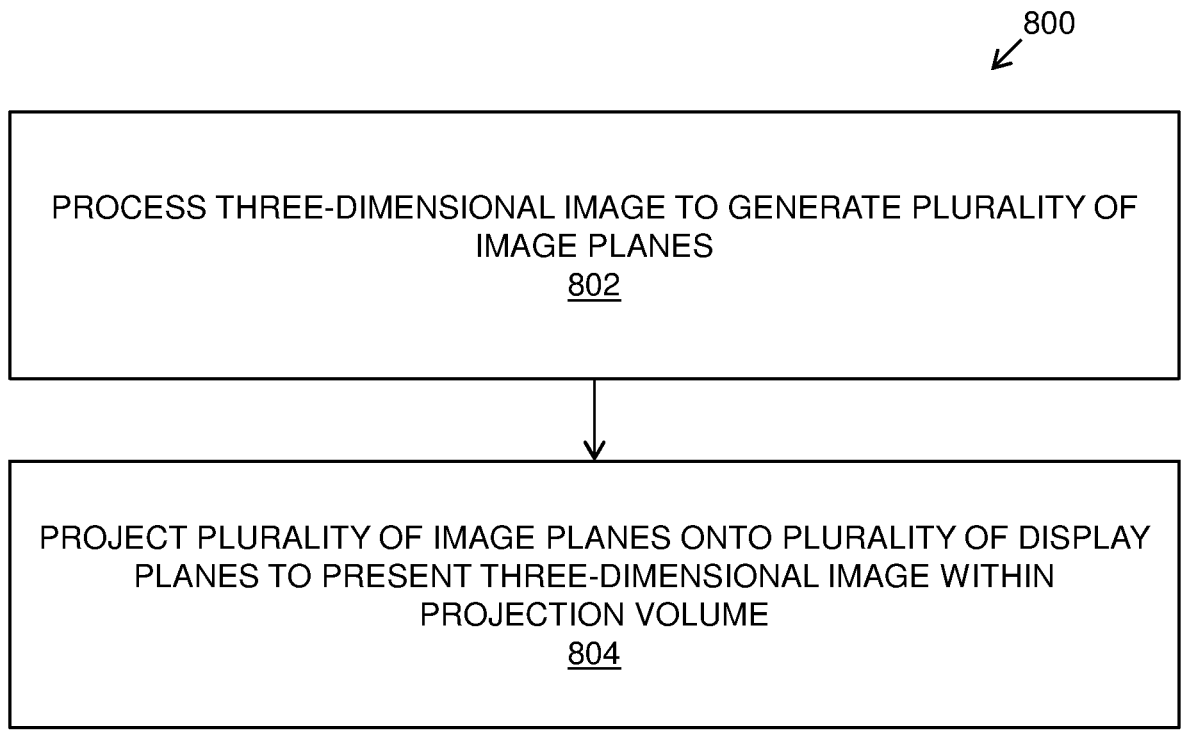
FIG. 8 illustrates steps of a method for presenting a three-dimensional image, via a table-top volumetric display apparatus, in accordance with an embodiment of the present disclosure.

Referring to FIG. 8, illustrated are steps of a method 800 for presenting a three-dimensional image, via a table-top volumetric display apparatus, in accordance with an embodiment of the present disclosure. In the method 800, the table-top volumetric display apparatus comprises a multi-layer volumetric display and at least one projector, wherein the multi-layer volumetric display comprises a plurality of display elements, the plurality of display elements being arranged substantially parallelly to form a projection volume. At step 802, the three-dimensional image is processed to generate a plurality of image slices, wherein a given image slice is to be projected onto a corresponding display element. At step 804, the plurality of image slices are projected onto the plurality of display elements via the at least one projector, whilst controlling operational states of the plurality of display elements, to present the three-dimensional image within the projection volume.

The steps 802 to 804 are only illustrative and other alternatives can also be provided where one or more steps are added, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A table-top volumetric display apparatus for presenting a three-dimensional image, the table-top volumetric display apparatus comprising:

a multi-layer volumetric display comprising a plurality of display elements, the plurality of display elements being arranged substantially in parallel to form a projection volume, each of the plurality of display elements being implemented by way of at least one optical diffuser;

volumetric display driver coupled to the multi-layer volumetric display, the volumetric display driver being configured to control operational states of the plurality of display elements;

a processing unit configured to process the three-dimensional image to generate a plurality of image slices, wherein a given image slice is to be projected onto a corresponding display element;

at least one projector configured to project the plurality of image slices onto the plurality of display elements;

a control unit coupled to the volumetric display driver, the processing unit and the at least one projector, wherein the control unit is configured to control the volumetric display driver and the at least one projector to present the three-dimensional image within the projection volume; and a separation arrangement adjacent and substantially perpendicular to the multi-layer volumetric display, wherein the separation arrangement is configured to absorb unwanted reflections of light within the table-top volumetric display apparatus and/or to limit penetration of a projection of a given image slice intended for a given portion of a given display element into an adjacent portion of the given display element.

2. The table-top volumetric display apparatus of claim 1, wherein the processing unit is configured to process a given image slice that is to be projected onto a given display element in a manner that graphical information represented in the given image slice is entirely displayable within a useable fill region of the given display element.

3. The table-top volumetric display apparatus of claim 2, wherein the processing unit is configured to process the given image slice based upon an angular width of the useable fill region of the given display element.

4. The table-top volumetric display apparatus of claim 1, wherein the plurality of display elements are laminated together.

5. The table-top volumetric display apparatus of claim 1, wherein the plurality of display elements are arranged in a stacked manner.

6. The table-top volumetric display apparatus of claim 1, wherein the at least one optical diffuser comprises a plurality of optical diffusers, the plurality of optical diffusers being arranged in a tiled manner.

7. The table-top volumetric display apparatus of claim 1, wherein the at least one projector comprises a first projector and a second projector, the first projector and the second projector being arranged on opposite sides of the separation arrangement.

8. The table-top volumetric display apparatus of claim 7, wherein the first projector is configured to project a first portion of the plurality of image slices onto a first portion of the plurality of display elements, whereas the second projector is configured to project a second portion of the plurality of image slices onto a second portion of the plurality of display elements.

9. The table-top volumetric display apparatus of claim 1, wherein the at least one projector is to be arranged in a manner that a light source of the at least one projector is invisible to a user.

10. The table-top volumetric display apparatus of claim 1, wherein the at least one projector comprises a plurality of projectors that are configured to project a given image slice onto a corresponding display element in a complementary additive manner.

11. The table-top volumetric display apparatus of claim 1, wherein the multi-layer volumetric display further comprises at least one protective cover employed to protect the plurality of display elements.

12. The table-top volumetric display apparatus of claim 1, further comprising at least one input device coupled to the processing unit, wherein the at least one input device, in operation, allows a user to provide an input to interactively control image content that is presented via the table-top volumetric display apparatus, further wherein the processing unit is configured to process the three-dimensional image to generate the plurality of image slices, based upon the user's input.

13. The table-top volumetric display apparatus of claim 12, wherein the input of the user is in a form of at least one of: a gesture, an audio signal, a haptic signal.

14. The table-top volumetric display apparatus of claim 12, wherein the table-top volumetric display apparatus allows the user to perform at least one of: zoom control of the three-dimensional image, resizing of the three-dimensional image, color adjustment of the three-dimensional image, brightness adjustment of the three-dimensional image, addition and/or removal of a graphical object within the three-dimensional image, movement of the three-dimensional image.

15. The table-top volumetric display apparatus of claim 1, wherein the processing unit is communicably coupled to an external image source, the processing unit being configured to obtain a sequence of three-dimensional images from the external image source, and to process individual three-dimensional images of the sequence to generate corresponding image slices, for presenting the sequence of three-dimensional images within the projection volume in real or near-real time.

16. A method for presenting a three-dimensional image, via a table-top volumetric display apparatus comprising a multi-layer volumetric display and at least one projector, wherein the multi-layer volumetric display comprises a plurality of display elements, the plurality of display elements being arranged substantially in parallel to form a projection volume, the method comprising:
- processing the three-dimensional image to generate a plurality of image slices, wherein a given image slice is to be projected onto a corresponding display element;
- projecting, via the at least one projector, the plurality of image slices onto the plurality of display elements, whilst controlling operational states of the plurality of display elements, to present the three-dimensional image within the projection volume; and
- processing a given image slice that is to be projected onto a given display element in a manner that graphical information represented in the given image slice is entirely displayable within a useable fill region of the given display element.

17. The method of claim 16, further comprising processing the given image slice based upon an angular width of the useable fill region of the given display element.

18. The method of claim 16, wherein the at least one projector comprises a plurality of projectors, the method comprising projecting, via the plurality of projectors, a given image slice onto a corresponding display element in a complementary additive manner.

19. The method of claim 16, further comprising processing the three-dimensional image to generate the plurality of image slices based upon a user's input.

20. The method of claim 19, wherein the method further comprises allowing, via at least one input device of the table-top volumetric display apparatus, the user to perform at least one of: zoom control of the three-dimensional image, resizing of the three-dimensional image, color adjustment of the three-dimensional image, brightness adjustment of the three-dimensional image, addition and/or removal of a graphical object within the three-dimensional image, movement of the three-dimensional image.

21. The method of claim 16, wherein the method further comprises obtaining a sequence of three-dimensional images from an external image source, and processing individual three-dimensional images of the sequence to generate corresponding image slices, for presenting the sequence of three-dimensional images within the projection volume in real or near-real time.

* * * * *